(12) United States Patent
Sekiguchi et al.

(10) Patent No.: US 8,948,243 B2
(45) Date of Patent: Feb. 3, 2015

(54) IMAGE ENCODING DEVICE, IMAGE DECODING DEVICE, IMAGE ENCODING METHOD, AND IMAGE DECODING METHOD

(75) Inventors: Shunichi Sekiguchi, Tokyo (JP); Yusuke Itani, Tokyo (JP); Kazuo Sugimoto, Tokyo (JP); Yoshihisa Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 299 days.

(21) Appl. No.: 13/638,095

(22) PCT Filed: Mar. 7, 2011

(86) PCT No.: PCT/JP2011/001329
§ 371 (c)(1),
(2), (4) Date: Sep. 28, 2012

(87) PCT Pub. No.: WO2011/121894
PCT Pub. Date: Oct. 6, 2011

(65) Prior Publication Data
US 2013/0022124 A1    Jan. 24, 2013

(30) Foreign Application Priority Data

Mar. 31, 2010   (JP) ................................. 2010-081830

(51) Int. Cl.
*H04N 7/32*         (2006.01)
*H04N 19/132*       (2014.01)
(Continued)

(52) U.S. Cl.
CPC ... *H04N 19/00127* (2013.01); *H04N 19/00024* (2013.01); *H04N 19/00266* (2013.01);
(Continued)

(58) Field of Classification Search
USPC .................................................... 375/240.16
See application file for complete search history.

(56) References Cited

U.S. PATENT DOCUMENTS 6,256,417 B1 *   7/2001   Takahashi et al. ............ 382/232
6,529,632 B1 *   3/2003   Nakaya et al. ................ 382/236
(Continued)

FOREIGN PATENT DOCUMENTS

JP    2003-102013 A    4/2003
JP    2005-102170 A    4/2005
(Continued)

OTHER PUBLICATIONS

Sasai et al., "Frame-Rate Up-Conversion Using Reliable Analysis of Transmitted Motion Information", 2004 IEEE, pp. 257-260.

*Primary Examiner* — Sath V Perungavoor
*Assistant Examiner* — Howard D Brown, Jr.
(74) *Attorney, Agent, or Firm* — Birch, Stewart, Kolasch & Birch, LLP

(57) ABSTRACT

Disclosed is an image encoding device which is constructed in such a way as to include an encoding mode determining unit 4 for evaluating the degree of efficiency of encoding of a difference image A which is the difference between an image of a macroblock to be encoded, and a prediction image A generated by a motion-compensated prediction unit 2 in a motion prediction mode A, and also evaluating the degree of efficiency of encoding of a difference image B which is the difference between the image of the macroblock to be encoded, and a prediction image B generated by the motion-compensated prediction unit 2 in a motion prediction mode B, and for selecting a difference image having a higher degree of encoding efficiency.

15 Claims, 11 Drawing Sheets

(51) Int. Cl.
*H04N 19/105* (2014.01)
*H04N 19/172* (2014.01)
*H04N 19/176* (2014.01)
*H04N 19/147* (2014.01)
*H04N 19/61* (2014.01)
*H04N 19/82* (2014.01)
*H04N 19/46* (2014.01)

(52) U.S. Cl.
CPC ... *H04N19/00278* (2013.01); *H04N 19/00175* (2013.01); *H04N 19/00781* (2013.01); *H04N 19/00896* (2013.01); *H04N 19/00545* (2013.01)
USPC .......................................................... 375/240

(56) References Cited

U.S. PATENT DOCUMENTS

| | | | |
|---|---|---|---|
| 6,560,367 B1 * | 5/2003 | Nakaya | 382/238 |
| 7,702,017 B2 * | 4/2010 | Boon et al. | 375/240.12 |
| 7,747,094 B2 * | 6/2010 | Sekiguchi et al. | 382/239 |
| 8,243,802 B2 * | 8/2012 | Boon et al. | 375/240.14 |
| 2003/0113026 A1 | 6/2003 | Srinivasan et al. | |
| 2004/0184666 A1 * | 9/2004 | Sekiguchi et al. | 382/236 |
| 2004/0252758 A1 | 12/2004 | Katsavounidis et al. | |
| 2005/0190977 A1 | 9/2005 | Jeon et al. | |
| 2007/0217500 A1 | 9/2007 | Gao et al. | |
| 2009/0180543 A1 | 7/2009 | Tsuda et al. | |
| 2010/0278266 A1 * | 11/2010 | Daian | 375/240.15 |
| 2010/0284467 A1 * | 11/2010 | Sekiguchi et al. | 375/240.16 |

FOREIGN PATENT DOCUMENTS

| | | |
|---|---|---|
| JP | 2005-513883 A | 5/2005 |
| JP | 2007-504760 A | 3/2007 |
| JP | 2007-513566 A | 5/2007 |
| JP | 2007-535221 A | 11/2007 |
| JP | 2009-188996 A | 8/2009 |
| JP | 2009-201112 A | 9/2009 |
| JP | 2009-232324 A | 10/2009 |
| WO | WO 2005/027497 A2 | 3/2005 |

* cited by examiner

FIG.5
(a)
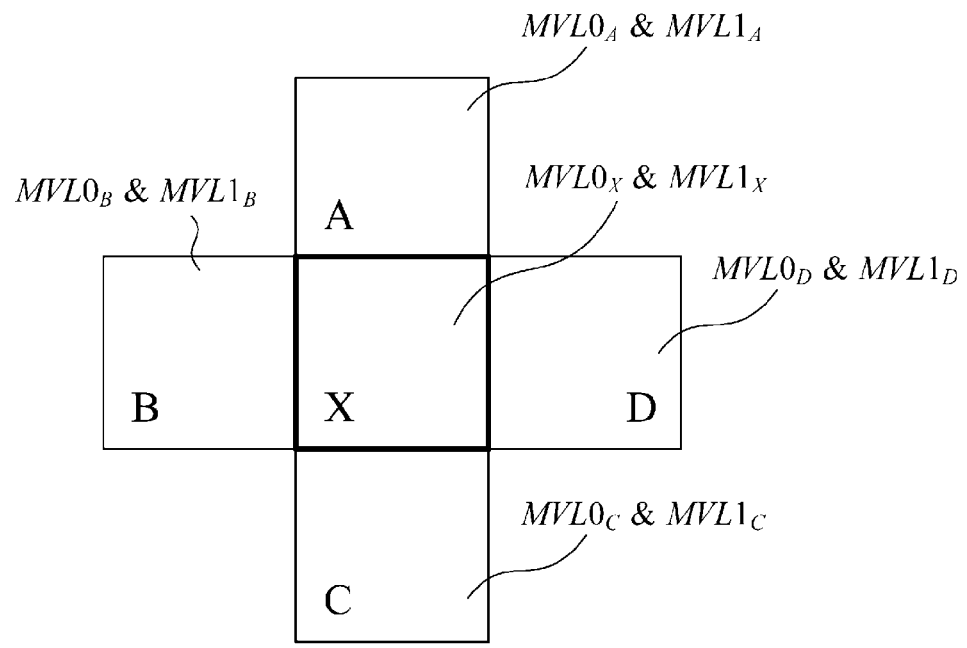
(b)
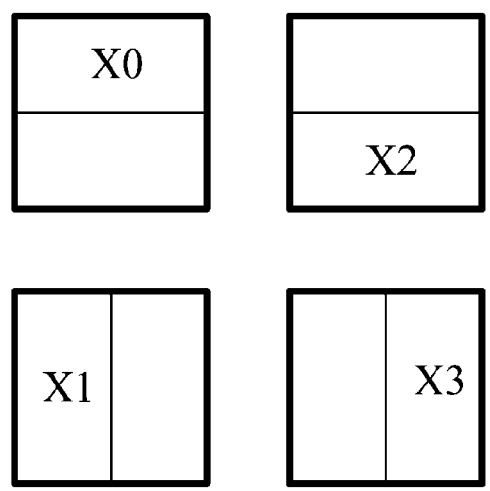

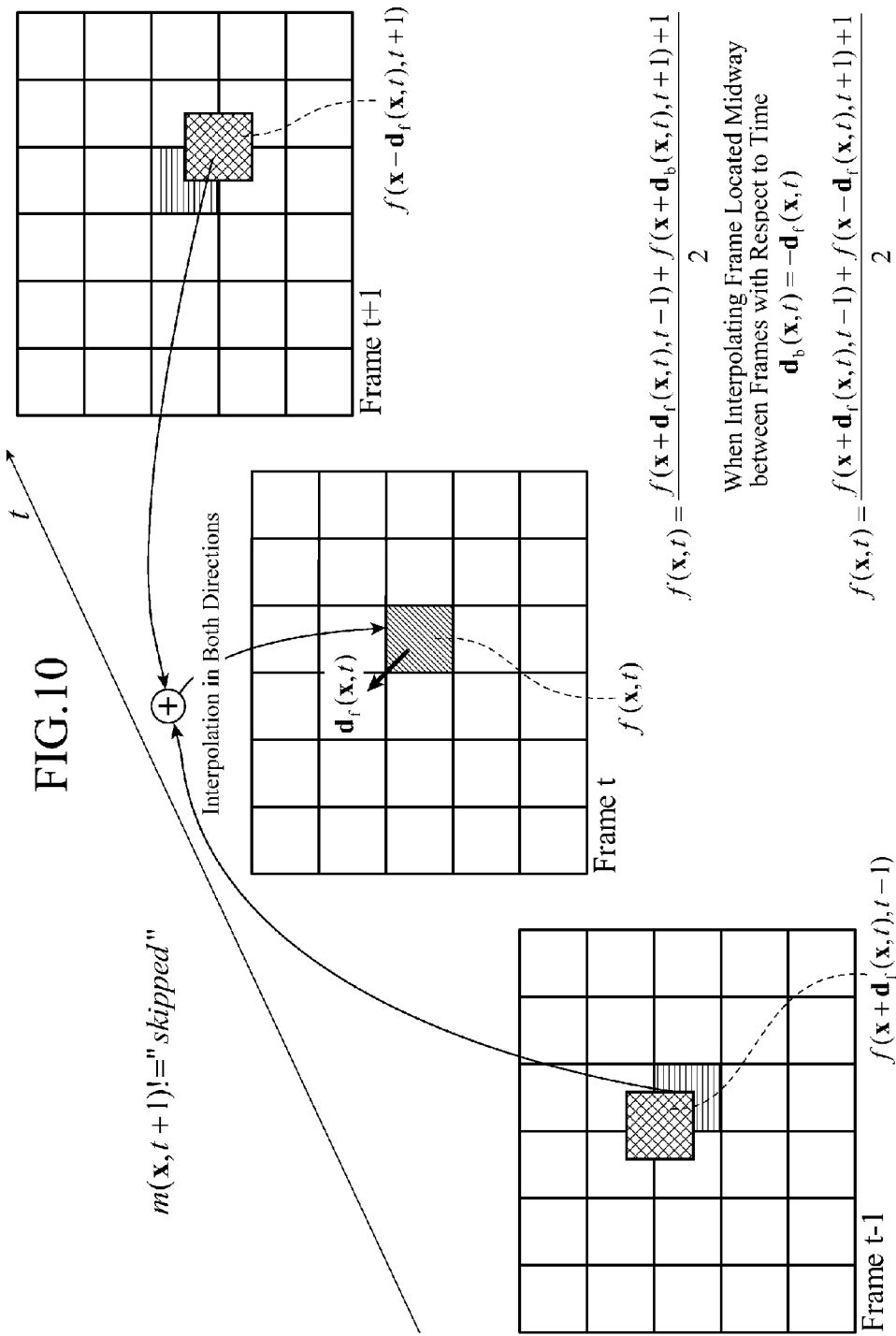

FIG.11

Estimate Motion Vector $d_f(x, t)$ of Macroblock x

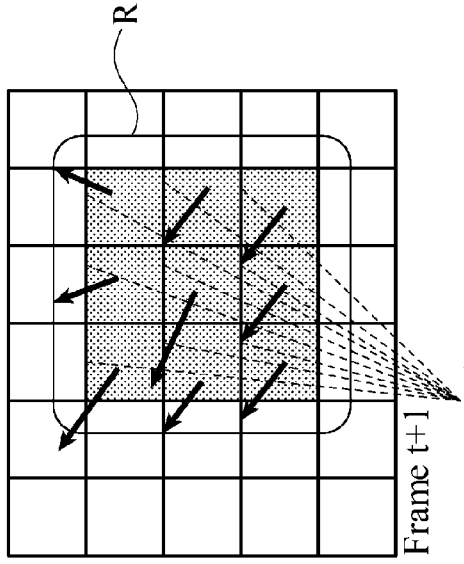

Frame t

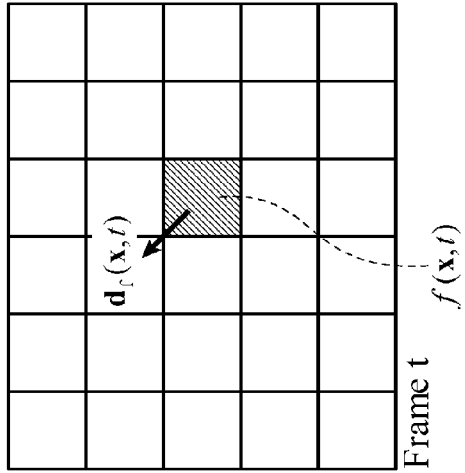

Frame t+1

Encoded Vector
$d(x+v_i, t+1), 0 \leq i \leq 8, (v_4 = 0)$

Encoding Residual
$e(x+v_i, t+1), 0 \leq i \leq 8, (v_4 = 0)$

Estimate Equation $d_f(x,t) = \alpha \cdot \dfrac{\sum_R \varphi_i d(x+v_i, t+1)}{\sum_R \varphi_i}$ where $\varphi_i = \dfrac{1}{\sqrt{\sum_{x \in B} |e(x+v_i, t+1)|}}$ $\alpha = \dfrac{1}{2}$ (When Interpolating Frame Just Located Midway between Frames with Respect to Time)

| .5 | .5 | .5 | .5 | .5 | .5 | .5 | .5 | .5 | .5 | .5 | .5 | .5 | .5 | .5 | .5 |
|---|---|---|---|---|---|---|---|---|---|---|---|---|---|---|---|
| .5 | .5 | .5 | .5 | .5 | .5 | .5 | .5 | .5 | .5 | .5 | .5 | .5 | .5 | .5 | .5 |
| .5 | .5 | .5 | .75 | .75 | .75 | .75 | .75 | .75 | .75 | .75 | .75 | .75 | .5 | .5 | .5 |
| .5 | .5 | .75 | .5 | .75 | .75 | .75 | .75 | .75 | .75 | .75 | .5 | .75 | .5 | .5 | |
| .5 | .5 | 75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .75 | 1 | 1 | 1 | 1 | 1 | 1 | 1 | 1 | .75 | .75 | .5 | .5 |
| .5 | .5 | .75 | .5 | .75 | .75 | .75 | .75 | .75 | .75 | .75 | .5 | .75 | .5 | .5 | |
| .5 | .5 | .5 | .75 | .75 | .75 | .75 | .75 | .75 | .75 | .75 | .75 | .75 | .5 | .5 | .5 |
| .5 | .5 | .5 | .5 | .5 | .5 | .5 | .5 | .5 | .5 | .5 | .5 | .5 | .5 | .5 | .5 |
| .5 | .5 | .5 | .5 | .5 | .5 | .5 | .5 | .5 | .5 | .5 | .5 | .5 | .5 | .5 | .5 |

| .25 | .25 | .5 | .5 | .5 | .5 | .5 | .5 | .5 | .5 | .5 | .5 | .5 | .5 | .25 | .25 |
|---|---|---|---|---|---|---|---|---|---|---|---|---|---|---|---|
| .25 | .25 | .5 | .5 | .5 | .5 | .5 | .5 | .5 | .5 | .5 | .5 | .5 | .5 | .25 | .25 |
| 0 | 0 | 25 | .25 | .25 | .25 | .25 | .25 | .25 | .25 | .25 | .25 | .25 | .25 | 0 | 0 |
| 0 | 0 | 0 | .25 | .25 | .25 | .25 | .25 | .25 | .25 | .25 | .25 | .25 | .25 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

$W_3$

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | .25 | .25 | .25 | .25 | .25 | .25 | .25 | .25 | .25 | .25 | .25 | 0 | 0 |
| 0 | 0 | 25 | .25 | .25 | .25 | .25 | .25 | .25 | .25 | .25 | .25 | .25 | .25 | 0 | 0 |
| .25 | .25 | .5 | .5 | .5 | .5 | .5 | .5 | .5 | .5 | .5 | .5 | .5 | .5 | .25 | .25 |
| .25 | .25 | .5 | .5 | .5 | .5 | .5 | .5 | .5 | .5 | .5 | .5 | .5 | .5 | .25 | .25 |

$W_2$

| .25 | .25 | 0 | 0 | 0 | 0 | 0 | 0 |
|---|---|---|---|---|---|---|---|
| .25 | .25 | 0 | 0 | 0 | 0 | 0 | 0 |
| .5 | .5 | .25 | 0 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | .25 | .25 | 0 | 0 | 0 | 0 |
| .5 | .5 | 25 | 0 | 0 | 0 | 0 | 0 |
| .25 | .25 | 0 | 0 | 0 | 0 | 0 | 0 |
| .25 | .25 | 0 | 0 | 0 | 0 | 0 | 0 |

$W_4$

| 0 | 0 | 0 | 0 | 0 | 0 | .25 | .25 |
|---|---|---|---|---|---|---|---|
| 0 | 0 | 0 | 0 | 0 | 0 | .25 | .25 |
| 0 | 0 | 0 | 0 | 0 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | .25 | .25 | .5 | .5 |
| 0 | 0 | 0 | 0 | 0 | 25 | .5 | .5 |
| 0 | 0 | 0 | 0 | 0 | 0 | .25 | .25 |
| 0 | 0 | 0 | 0 | 0 | 0 | .25 | .25 |

IMAGE ENCODING DEVICE, IMAGE DECODING DEVICE, IMAGE ENCODING METHOD, AND IMAGE DECODING METHOD

FIELD OF THE INVENTION

The present invention relates to an image encoding device, an image decoding device, an image encoding method, and an image decoding method which are used for an image compression encoding technique, a compressed image data transmission technique, etc.

BACKGROUND OF THE INVENTION

For example, in an international standard video encoding system, such as MPEG (Moving Picture Experts Group) or "ITU-T H.26x", a method of defining block data (referred to as "macroblock" from here on) as a unit, the block data being a combination of 16×16 pixels of brightness signal and 8×8 pixels of color difference signal corresponding to the 16×16 pixels of brightness signal, and compressing the block data in accordance with a motion compensation technique, and an orthogonal transformation/transform coefficient quantization technique is used.

The motion compensation technique is used to reduce the redundancy of a signal in a time direction for each macroblock by using a high correlation existing between video frames. More specifically, in accordance with the motion compensation technique, an already-encoded frame which has been encoded is stored in a memory as a reference image, and a block area which provides the smallest difference in electric power between the block area itself and the current macroblock which is a target block for the motion-compensated prediction is searched for through a search range predetermined in the reference image which is stored in the memory. In accordance with the motion compensation technique, a spatial displacement between the spatial position of the block area which provides the smallest difference electric power and the spatial position of the current macroblock is then encoded as a motion vector.

Because the above-mentioned motion vector shows not only the efficiency of prediction but also a local movement in each block between video frames in many cases, a technique of generating an interpolated image by using information about the motion vector in order to increase the number of frames per unit time (frame rate) of the video image has been developed in recent years. As the simplest model, for example, there is a method of, when generating an interpolated image located just midway between video frames with respect to time, using a value which is half of the value of a motion vector as the motion vector of the interpolated image, and compensating for movements on the basis of previous and next frames by using the motion vector. This model is based on the assumption that there is a linear movement between video frames. Because the shorter the time interval between video frames, the more easily the above-mentioned assumption is realized, and the smaller the motion vector, the more easily the above-mentioned assumption is realized, an interpolated image having up to a certain degree of quality can be generated.

However, although a motion vector shows a local movement in each block between video frames in many cases, as mentioned above, a motion vector is actually determined through a search for a block area which provides the smallest difference electric power, and therefore does not show a local movement in some cases. In such a case, a disorder occurs in an interpolated image, and the disorder is very noticeable in many cases. Therefore, the issue of how to determine a "motion vector which cannot express a movement correctly" and to what extent an original movement can be correctly estimated while excluding such a motion vector is important.

For example, the following nonpatent reference 1 and patent reference 1 disclose frame interpolation techniques of extracting motion parameters from a bitstream which is acquired by using a general-purpose video image encoding method for the purpose of pseudoly increasing the frame rate of a moving image to be reproduced by a receive side dependently upon the motion parameters.

RELATED ART DOCUMENT

Patent Reference

Patent reference 1: Japanese Unexamined Patent Application Publication No. 2009-188996

Nonpatent Reference

Nonpatent reference 1: H. Sasai, S. Kondoh, and S. Kadono, "Frame-rate Up-conversion using Reliable Analysis of Transmitted Motion Information", IEEE International Conference on Acoustic, Speech and Signal Processing (ICASSP) 2004, ITT-L1.5, May 2004.

SUMMARY OF THE INVENTION

Because the conventional image encoding devices are constructed as above, the receive side can improve the quality of the moving image reproduced thereby to a certain extent by pseudoly increasing the frame rate of the moving image reproduced thereby. A problem is, however, that because the conventional image encoding devices do not carry out optimal encoding control in such a way that adequate encoding quality can be acquired in the encoding process, and there is a limit in the improvement in the quality of the reproduced moving image acquired by the receive side and therefore the optimality of the quality of the reproduced moving image cannot guaranteed.

The present invention is made in order to solve the above-mentioned problem, and it is therefore an object of the present invention to provide an image encoding device and an image encoding method capable of improving the quality of a reproduced image acquired by a receive side. It is another object of the present invention to provide an image decoding device and an image decoding method capable of reproducing an image having high quality from encoded data transmitted from an image encoding device.

In accordance with the present invention, there is provided an image encoding device which carries out comprsssion encoding on each predetermined block of an imputed image by using a motion-compensated prediction, the image encoding device including: a motion detecting unit for detecting a motion vector of a block; a first prediction image generating unit for generating a first prediction image by using the motion vector detected by the motion detecting unit; a memory for holding a motion vector detected by the motion detecting unit; a second prediction image generating unit for generating a second prediction image by using a motion vector of a block to be encoded which is generated on a basis of the motion vector held by the memory; an encoding unit for encoding a difference image which is a difference between the first prediction image generated by the first prediction image generating unit and an image of the block to be encoded while encoding the motion vector used for the generation of the first prediction image; a local decoding unit for generating a local decoded image of the difference image, and for adding the local decoded image to the first prediction image to generate a local decoded image; and a filtering unit for carrying out a smoothing process on a block boundary in the second prediction image generated by the second prediction image generating unit, in which the image encoding device selects either the first local decoded image of the block which is acquired by the local decoding unit or an image acquired by the filtering unit as a local decoded image in a predetermined image area which consists of one or more of the blocks, and multiplexes a result of the selection into a bitstream and carries out encoding transmission of this bitstream.

Because the image encoding device in accordance with the present invention which carries out compression encoding on each predetermined block of an inputted image by using a motion-compensated prediction is constructed in such a way as to include: the motion detecting unit for detecting a motion vector of a block; the first prediction image generating unit for generating a first prediction image by using the motion vector detected by the motion detecting unit; the memory for holding a motion vector detected by the motion detecting unit; the second prediction image generating unit for generating a second prediction image by using a motion vector of a block to be encoded which is generated on a basis of the motion vector held by the memory; the encoding unit for encoding a difference image which is a difference between the first prediction image generated by the first prediction image generating unit and an image of the block to be encoded while encoding the motion vector used for the generation of the first prediction image; the local decoding unit for generating a local decoded image of the difference image, and for adding the local decoded image to the first prediction image to generate a local decoded image; and the filtering unit for carrying out a smoothing process on a block boundary in the second prediction image generated by the second prediction image generating unit, and to select either the first local decoded image of the block which is acquired by the local decoding unit or an image acquired by the filtering unit as a local decoded image in a predetermined image area which consists of one or more of the blocks, and multiplexes a result of the selection into a bitstream and carries out encoding transmission of this bitstream, there is provided an advantage of being able to improve the quality of a reproduced image acquired by a receive side.

BRIEF DESCRIPTION OF THE FIGURES

FIG. 5 is an explanatory drawing showing an overlap motion compensation process;

FIG. 10 is an explanatory drawing showing an example of a generating process of generating a prediction image B which is carried out by a motion-compensated prediction unit 2 (a generating process in a case of encoding a picture $F_t$ located just midway between already-encoded pictures $F_{t-1}$ and $F_{t+1}$ with respect to time as a skip picture);

FIG. 11 is an explanatory drawing showing an estimation of a motion vector $d_j(x, t)$ of a macroblock X;

FIG. 12 is an explanatory drawing showing weight parameters defined in accordance with the positions of pixels in a macroblock; and FIG. 13 is an explanatory drawing showing weight parameters defined in accordance with the positions of pixels in a macroblock.

EMBODIMENTS OF THE INVENTION

Hereafter, the preferred embodiments of the present invention will be explained in detail with reference to the drawings.
Embodiment 1.

Figure 1:
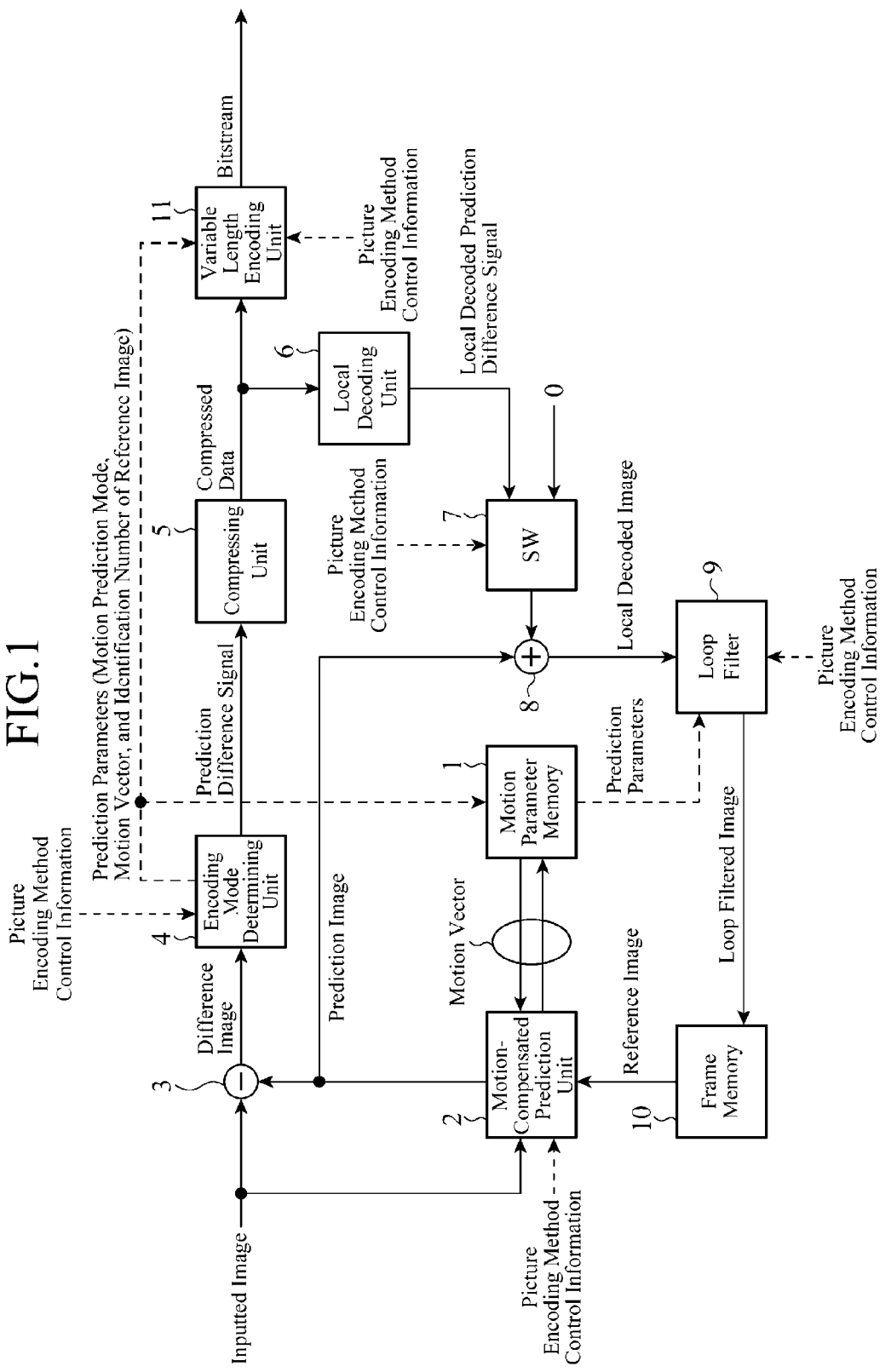
FIG. 1 is a block diagram showing an image encoding device in accordance with Embodiment 1 of the present invention.

FIG. 1 is a block diagram showing an image encoding device in accordance with Embodiment 1 of the present invention. In the image encoding device of FIG. 1, an inputted image is divided into inputted images of macroblocks (or inputted images of sub-macroblocks into which each macroblock is divided), and the inputted image of each macroblock (or each sub-macroblock) is inputted to a motion-compensated prediction unit 2 and a subtractor 3. It is assumed that encoding processing is carried out on each macroblock, and it is determined that the encoding processing on the inputted image is completed when the encoding processing on all macroblocks which construct this inputted image is completed. Hereafter, in this Embodiment 1, for the sake of simplicity, an explanation will be made by assuming that the inputted image of each macroblock is inputted to the motion-compensated prediction unit 2 and the subtractor 3. When the image inputted to the motion-compensated prediction unit 2 and the subtractor 3 is the one of each sub-macroblock, in the following explanation, "macroblock" is replaced by "sub-macroblock" and the completion of the process on each macroblock means the completion of the process on all the sub-macroblocks within the macroblock. Further, in the image encoding device shown in FIG. 1, picture encoding method control information (control information) showing whether either "normal picture encoding accompanied by encoding of both motion parameters and prediction residual information of each macroblock" or "skip picture encoding" is to be carried out is inputted to the motion-compensated prediction unit 2, an encoding mode determining unit 4, a selection switch 7, a loop filter 9, and a variable length encoding unit 11.

Referring to FIG. 1, a motion parameter memory 1 is a recording medium, such as a RAM, for storing, for example, prediction parameters (a motion prediction mode, a motion vector, and an identification number of a reference image), and so on of an already-encoded macroblock. The motion-compensated prediction unit 2 carries out a process of selecting a reference image which the motion-compensated prediction unit will actually use for prediction from among one or more frames of reference image for motion-compensated prediction which are stored in a frame memory 10 and performing a motion-compensated prediction process on each macroblock which constructs the inputted image to generate a prediction image. The motion-compensated prediction unit 2 has, as a prediction image generating method for use at the time of generating the prediction image, a first prediction image generating method (a prediction image generating method in accordance with a "motion prediction mode A"), and a second prediction image generating method (a prediction image generating method in accordance with a "motion prediction mode B"), and generates a prediction image in the motion prediction mode A and also generates a prediction image in the motion prediction mode B.

In the case of the motion prediction mode A, one of the one or more frames of reference image stored in the frame memory 10 is selected, and a block which expresses the image pattern of a macroblock which is a target for motion-compensated prediction most exactly is specified within this selected reference image from among blocks at positions which are translated and displaced from the starting point at the position on the screen of the target macroblock, so that a motion vector is determined as the amount of displacement in the screen for the target macroblock. More specifically, because a motion vector is defined by a reference image with which the motion vector is paired and which is used for the calculation of the motion vector, the motion vector is identified by a reference image identification number showing which one of the one or more frames of reference image stored in the frame memory 10 has been used to calculate the motion vector. When two or more motion vectors are allocated to the macroblock which is the target for motion-compensated prediction, each of the two or more motion vectors is identified by a reference image identification number showing which one of the one or more frames of reference image has been used to calculate the motion vector. When two or more motion vectors are used for the macroblock which is the target for motion-compensated prediction, the two or more motion vectors can be denoted by different reference image identification numbers, respectively, or some of the two or more motion vectors can be denoted by the same reference image identification number. The motion-compensated prediction unit generates a prediction image A by using the motion vector acquired thereby and the reference image identification number (generates a prediction image A from the position on the screen of the macroblock which is the target for motion-compensated prediction by using an image area at the position which is displaced by the motion vector). In the case of the motion prediction mode B, the motion-compensated prediction unit generates an estimated vector of a macroblock for which the prediction parameters are to be encoded, the macroblock being included in the already-encoded macroblocks stored in the motion parameter memory 1, and carries out a motion-compensated prediction process using the estimated vector to generate a prediction image B.

When the picture encoding method control information shows that "normal picture encoding is to be carried out", the motion-compensated prediction unit 2 generates a prediction image in the motion prediction mode A and also generates a prediction image in the motion prediction mode B. In contrast, when the picture encoding method control information shows that "skip picture encoding is to be carried out", the motion-compensated prediction unit 2 does not use the motion prediction mode A, but generates a prediction image in the motion prediction mode B. The motion-compensated prediction unit 2 constructs a prediction image generating unit.

The subtractor 3 carries out a process of determining a difference between the image of the macroblock to be encoded and the prediction image A generated by the motion-compensated prediction unit 2 in the motion prediction mode A to calculate a difference image A while determining a difference between the image of the macroblock to be encoded and the prediction image B generated by the motion-compensated prediction unit 2 in the motion prediction mode B to calculate a difference image B. Because the prediction image A is not generated when the picture encoding method control information shows that "skip picture encoding" is to be carried out, the subtractor does not carry out the process of determining a difference between the image of the macroblock to be encoded and the prediction image A generated in the motion prediction mode A to calculate a difference image A.

The encoding mode determining unit 4 carries out a process of evaluating the degree of efficiency of encoding of the difference image A which is the difference between the image of the macroblock to be encoded and the prediction image A generated in the motion prediction mode A and also evaluating the degree of efficiency of encoding of the difference image B which is the difference between the image of the macroblock to be encoded and the prediction image B generated in the motion prediction mode B to select the difference image having the highest degree of encoding efficiency from the difference images. The encoding mode determining unit 4 also carries out a process of outputting a prediction difference signal showing the difference image having the highest degree of encoding efficiency to a compressing unit 5 while storing the prediction parameters used for the generation of the prediction image associated with the difference image (the motion prediction mode (prediction image identification information), the motion vector (or direct vector), and the identification number of the reference image) in the motion parameter memory 1, and outputting the prediction parameters (the motion prediction mode (prediction image identification information), the motion vector (only when the difference image A is selected, the motion vector is included in the prediction parameters, whereas when the difference image B is selected, the motion vector is not included in the prediction parameters), and the identification number of the reference image) to the variable length encoding unit 11. Because the prediction image A is not generated when the picture encoding method control information shows that "skip picture encoding" is to be carried out, the encoding mode determining unit does not carry out the process of evaluating the degree of efficiency of encoding of the difference image A. A difference image selecting unit is comprised of the subtractor 3 and the encoding mode determining unit 4.

The compressing unit 5 carries out a process of calculating DCT coefficients by carrying out a DCT (discrete cosine transform) process on the prediction difference signal outputted from the encoding mode determining unit 4 and also quantizing the DCT coefficients to output compressed data which are the DCT coefficients quantized thereby to a local decoding unit 6 and the variable length encoding unit 11. The compressing unit 5 constructs a quantizing unit.

The local decoding unit 6 carries out a process of inverse-quantizing the compressed data outputted from the compressing unit 5 to calculate DCT coefficients, and then carrying out an inverse DCT (inverse discrete cosine transform) process on the DCT coefficients to calculate a local decoded prediction difference signal corresponding to the prediction difference signal outputted from the encoding mode determining unit 4. The selection switch 7 carries out a process of selecting the local decoded prediction difference signal calculated by the local decoded section 6 and outputting this local decoded prediction difference signal to an adder 8 when the picture encoding method control information shows that "normal picture encoding is to be carried out", or selecting all zero values and outputting these all zero values to the adder 8 when the picture encoding method control information shows that "skip picture encoding is to be carried out".

The adder 8 carries out a process of adding either the local decoded prediction difference signal or the all zero values which are selected by the selection switch 7 to the prediction signal showing the prediction image generated by the motion-compensated prediction unit 2 (i.e. the prediction image associated with the difference image having the highest degree of encoding efficiency) to generate a local decoded image signal showing a local decoded image. When the picture encoding method control information shows that "normal picture encoding is to be carried out", the loop filter 9 carries out a distortion compensation process of compensating for an encoding distortion included in the local decoded image generated by the adder 8 by using a block distortion removal filter (deblocking filter) for a DCT block boundary. In contrast, when the picture encoding method control information shows that "skip picture encoding is to be carried out", the loop filter 9 carries out a motion block boundary smoothing process of smoothing the discontinuity at a block boundary (a macroblock boundary in the motion prediction mode B) which occurs in a motion vector allocation region of the prediction image. A reference image generating unit is comprised of the local decoding unit 6, the selection switch 7, the adder 8, and the loop filter 9.

The frame memory 10 is a recording medium, such as a RAM, for storing a loop filtered image (a local decoded image filtered) outputted from the loop filter 9 as a reference image therein. The variable length encoding unit 11 carries out a process of entropy-encoding the compressed data outputted from the compressing unit 5 (including the quantization parameters used at the time of quantizing the DCT coefficients), and the prediction parameters and the picture encoding method control information which are outputted from the encoding mode determining unit 4 to generate a bitstream (encoded data) showing the encoded results and output the bitstream. The variable length encoding unit 11 constructs a variable length encoding unit.

Figure 8:
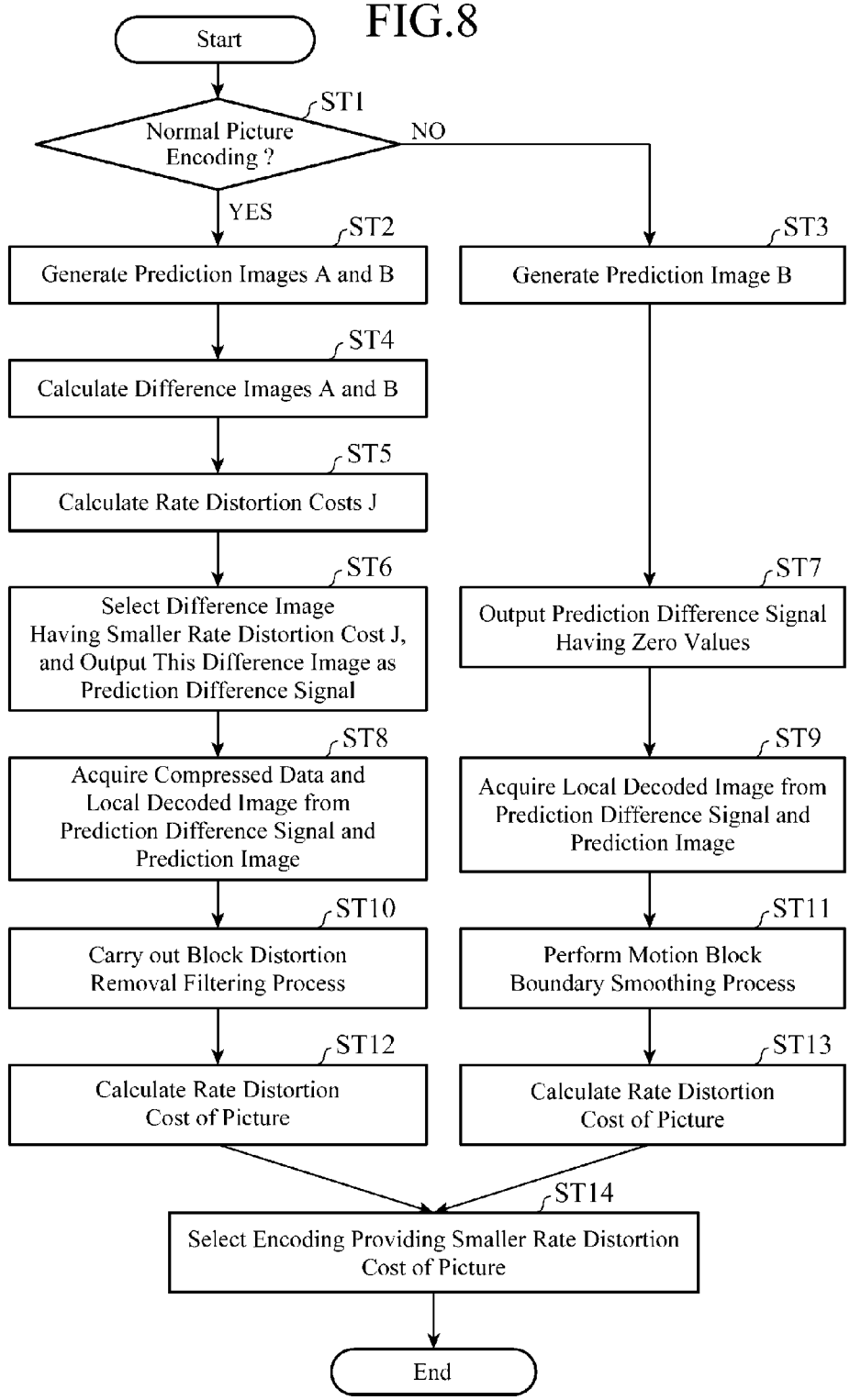
FIG. 8 is a flow chart showing processing carried out by the image encoding device in accordance with Embodiment 1 of the present invention.

In the structure shown in FIG. 1, it is assumed that the motion-compensated prediction unit 2, the subtractor 3, the encoding mode determining unit 4, the compressing unit 5, the local decoding unit 6, the selection switch 7, the adder 8, the loop filter 9, and the variable length encoding unit 11 which are the components of the image encoding device, consist of pieces of hardware for exclusive use (e.g., integrated circuits in each of which a CPU is mounted, or one-chip microcomputers), respectively. In a case in which the image encoding device consists of a computer, a program in which the processes carried out by the motion-compensated prediction unit 2, the subtractor 3, the encoding mode determining unit 4, the compressing unit 5, the local decoding unit 6, the selection switch 7, the adder 8, the loop filter 9, and the variable length encoding unit 11 are described can be stored in a memory of the computer, and a CPU of the computer can be made to execute the program stored in the memory. FIG. 8 is a flow chart showing the processing carried out by the image encoding device in accordance with Embodiment 1 of the present invention.

Figure 7:
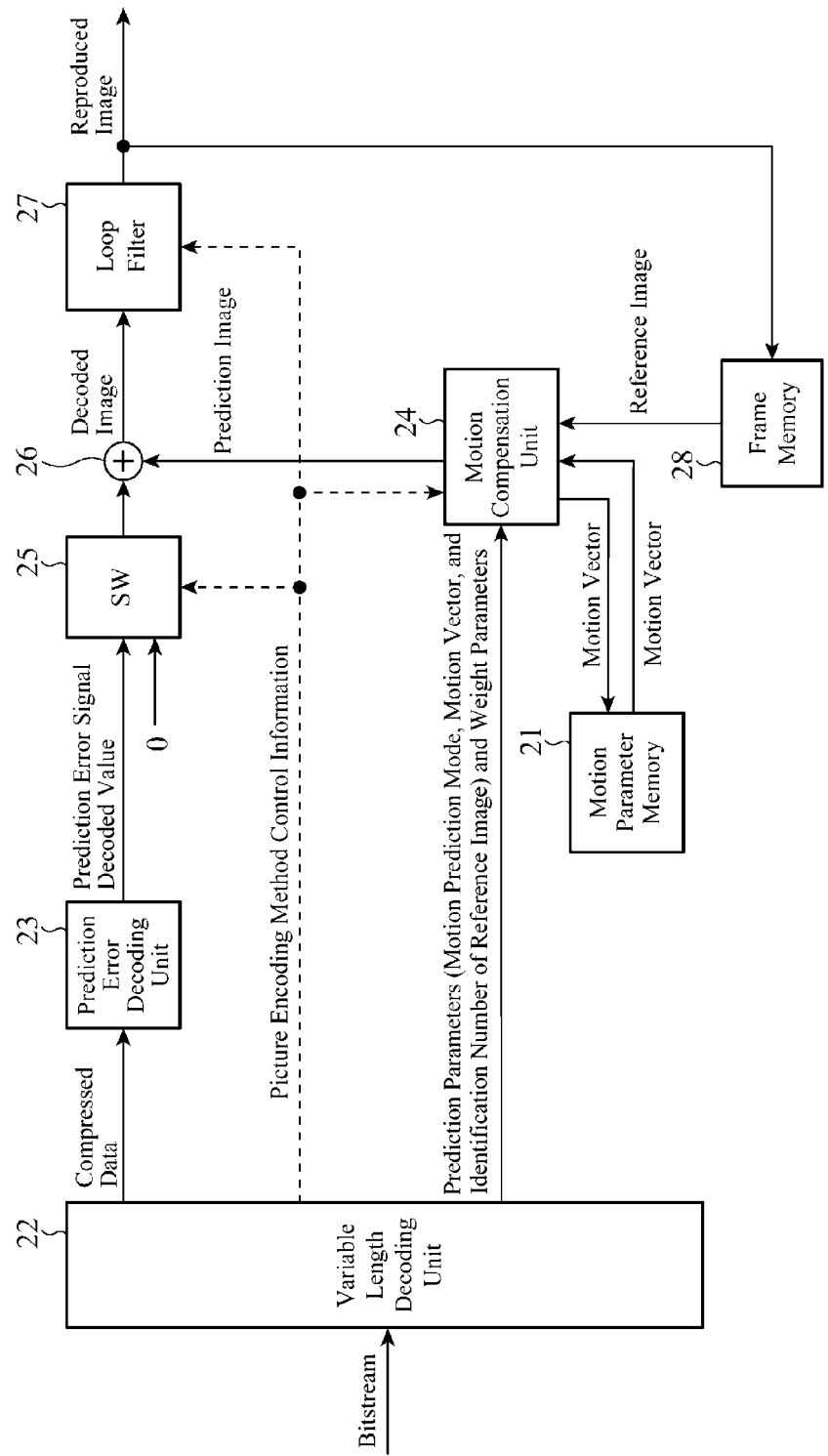
FIG. 7 is a block diagram showing an image decoding device in accordance with Embodiment 1 of the present invention.

FIG. 7 is a block diagram showing an image decoding device in accordance with Embodiment 1 of the present invention. It is assumed that decoding processing is carried out on each macroblock, and it is determined that the decoding processing on an image to be decoded is completed when the decoding processing on all macroblocks which construct the image to be decoded is completed. In addition, in a case in which each macroblock consists of a plurality of sub-macroblocks, it is determined that the decoding processing on each macroblock is completed when the processing on all the sub-macroblocks within the macroblock is completed. Hereafter, for the sake of simplicity, although an explanation will be made by dealing with each "macroblock" as a unit to be processed in agreement with the above explanation of the encoding device, the decoding processing which will be explained below can be explained as the one on each sub-macroblock by replacing "macroblock" with "sub-macroblock". In FIG. 7, a motion parameter memory 21 is a recording medium, such as a RAM, for storing, for example, prediction parameters (a motion prediction mode, a motion vector, and the identification number of a reference image) of an already-decoded macroblock (or an already-decoded sub-macroblock), and so on.

A variable length decoding unit 22 carries out a process of receiving the bitstream (encoded data) outputted thereto from the image encoding device shown in FIG. 1, entropy-decoding the compressed data (including the quantization parameters used at the time of quantizing the DCT coefficients), the prediction parameters (the motion prediction mode (prediction image identification information), the motion vector (the motion vector is included in the prediction parameters when the difference image A is selected by the encoding mode determining unit 4 shown in FIG. 1, whereas the motion vector is not included in the prediction parameters when the difference image B is selected by the encoding mode determining unit), and the identification number of the reference image) and the picture encoding method control information from the bitstream, outputting the compressed data to a prediction error decoding unit 23, outputting the prediction parameters to a motion compensation unit 24, and also outputting the picture encoding method control information to the motion compensation unit 24, a selection switch 25, and a loop filter 27. The variable length decoding unit 22 constructs a variable length decoding unit.

The prediction error decoding unit 23 carries out a process of inverse-quantizing the compressed data outputted from the variable length decoding unit 22 to acquire the DCT coefficients, and carrying out an inverse DCT process on the DCT coefficients to calculate a prediction error signal decoded value (i.e. a signal corresponding to the prediction difference signal outputted from the encoding mode determining unit 4 of FIG. 1) which shows a difference image. The prediction error decoding unit 23 constructs an inverse quantizing unit.

The motion compensation unit 24 carries out a process of reading the reference image shown by the identification number in the prediction parameters outputted from the variable length decoding unit 22 from one or more frames of reference image stored in a frame memory 28, and, when the picture encoding method control information outputted from the variable length decoding unit 22 shows that "normal picture encoding is to be carried out", performing a motion compensation process using the motion prediction mode and the motion vector, which are included in the prediction parameters outputted from the variable length decoding unit 22, and the above-mentioned reference image to generate a prediction image A. In contrast, when the picture encoding method control information outputted from the variable length decoding unit 22 shows that "skip picture encoding is to be carried out", the motion compensation unit carries out a process of generating an estimated vector of the macroblock to be decoded from the motion vector of the already-decoded macroblock stored in the motion parameter memory 21, and performing a motion compensation process using the estimated vector to generate a prediction image B. The motion compensation unit 24 constructs a prediction image generating unit.

When the picture encoding method control information outputted from the variable length decoding unit 22 shows that "normal picture encoding is to be carried out", the selection switch 25 carries out a process of selecting the prediction error signal decoded value calculated by the prediction error decoding unit 23, and outputting the prediction error signal decoded value to an adder 26. In contrast, when the picture encoding method control information outputted from the variable length decoding unit shows that "skip picture encoding is to be carried out", the selection switch carries out a process of selecting all zero values and outputting these all zero values to the adder 26. The adder 26 carries out a process of adding either the local decoded prediction difference signal or the all zero values selected by the selection switch 25 to the prediction signal showing the prediction image generated by the motion compensation unit 24 to generate a decoded image signal showing a decoded image.

When the picture encoding method control information outputted from the variable length decoding unit 22 shows that "normal picture encoding is to be carried out", the loop filter 27 carries out a distortion compensation process of compensating for an encoding distortion included in the decoded image generated by the adder 26 by using a block distortion removal filter (deblocking filter) for a DCT block boundary. In contrast, when the picture encoding method control information outputted from the variable length decoding unit shows that "skip picture encoding is to be carried out", the loop filter carries out a motion block boundary smoothing process of smoothing the discontinuity at a block boundary (in the motion prediction mode B, a macroblock boundary) which occurs in the motion vector allocation region of the prediction image. A decoded image generating unit is comprised of the selection switch 25, the adder 26, and the loop filter 27. The frame memory 28 is a recording medium, such as a RAM, for storing a reproduced image (the decoded image filtered) outputted from the loop filter 27 as a reference image.

Figure 9:
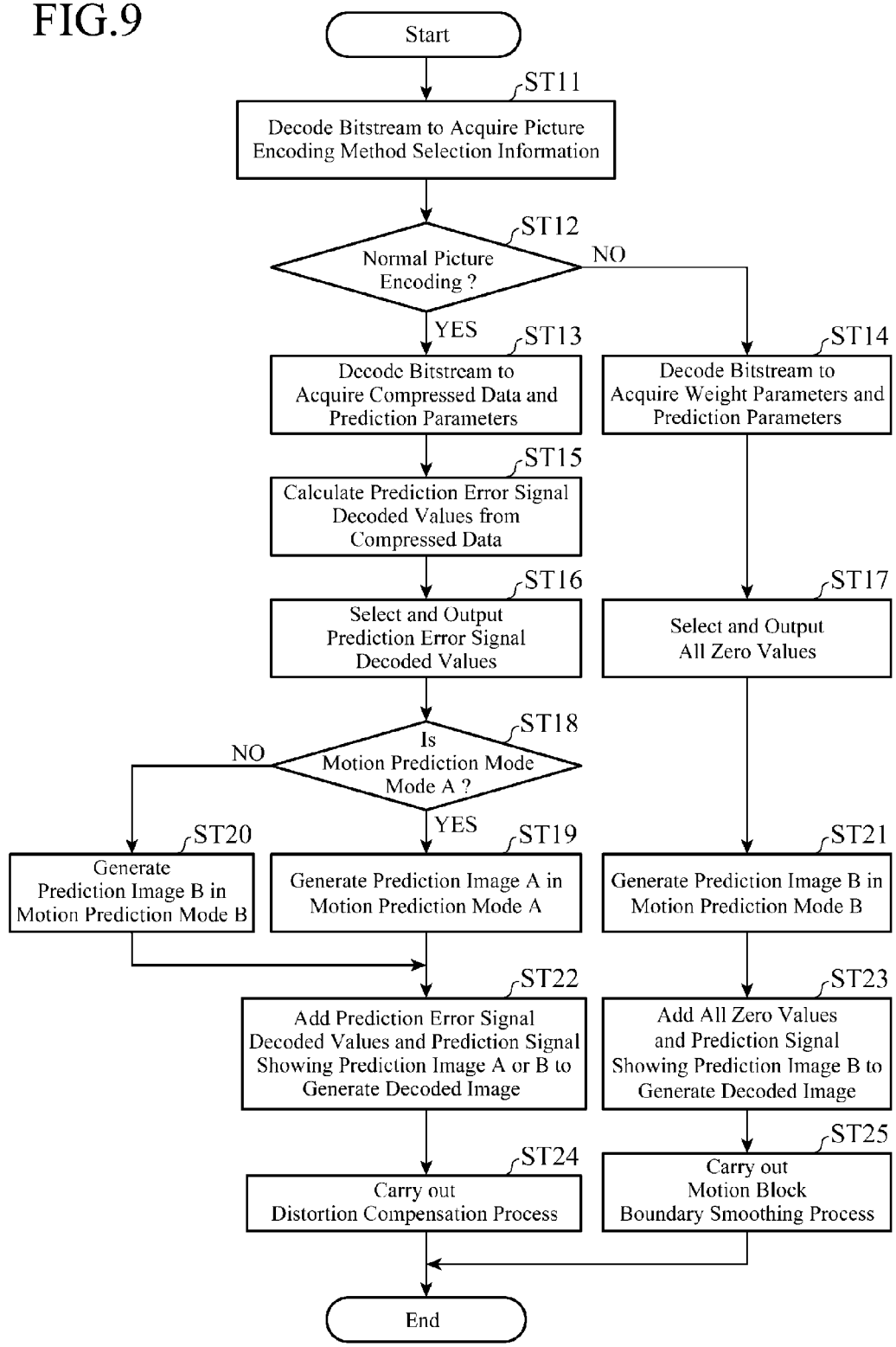
FIG. 9 is a flow chart showing processing carried out by an image decoding device in accordance with Embodiment 1 of the present invention.

In the structure shown in FIG. 7, it is assumed that the variable length decoding unit 22, the prediction error decoding unit 23, the motion compensation unit 24, the selection switch 25, the adder 26, and the loop filter 27, which are the components of the image decoding device, consist of pieces of hardware for exclusive use (e.g., integrated circuits in each of which a CPU is mounted, or one-chip microcomputers), respectively. In a case in which the image decoding device consists of a computer, a program in which the processes carried out by the variable length decoding unit 22, the prediction error decoding unit 23, the motion compensation unit 24, the selection switch 25, the adder 26, and the loop filter 27 are described can be stored in a memory of the computer, and a CPU of the computer can be made to execute the program stored in the memory. FIG. 9 is a flow chart showing the processing carried out by the image decoding device in accordance with Embodiment 1 of the present invention.

Figure 2:
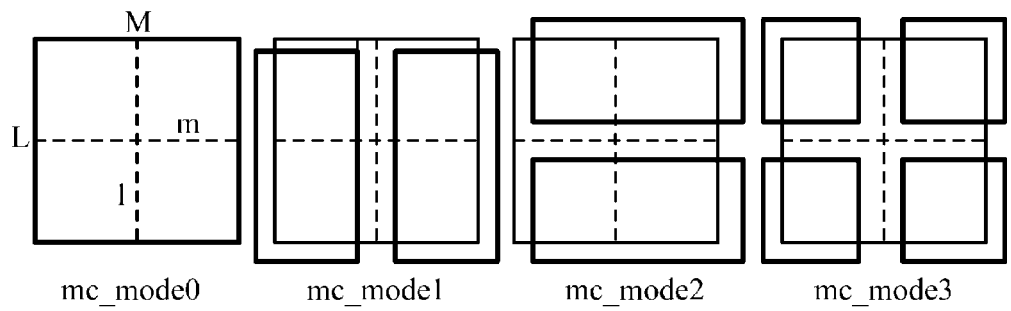
FIG. 2 is an explanatory drawing showing an example of motion prediction modes selectable in accordance with a picture type.

Next, the operations of the image encoding device and the image decoding device will be explained. First, the processing carried out by the image encoding device will be explained. The motion-compensated prediction unit 2 generates a prediction image for each of all motion prediction modes (patterns of allocation of a motion vector within each macroblock or each subblock) which are selectable in accordance with a picture type specified. FIG. 2 is an explanatory drawing showing an example of the motion prediction modes which are selectable in accordance with the picture type.

In FIG. 2, mc_mode0 is the mode in which one motion vector is allocated to an entire macroblock (M×L pixel block). mc_mode1 is the mode in which a macroblock is divided into equal parts which are aligned horizontally, and different motion vectors are allocated to the right and left subblocks into which the macroblock is divided, respectively. mc_mode2 is the mode in which a macroblock is divided into equal parts which are aligned vertically, and different motion vectors are allocated to the upper and lower subblocks into which the macroblock is divided, respectively. mc_mode3 is the mode in which a macroblock is divided into four parts, and different motion vectors are allocated to the four subblocks into which the macroblock is divided, respectively. Each of the units into which each macroblock is divided in mc_mode3 is a sub-macroblock, and each sub-macroblock can be further divided into parts in a mode, such as mc_mode0, . . . , or mc_mode3, and a motion vector can be allocated to each of the parts. Because each sub-macroblock corresponds to a block of 16×16 pixels when each macroblock has a sufficient large size (e.g. a block of 32×32 pixels, a block of 64×64 pixels, or the like), each sub-macroblock can be divided more finely into smaller units in such a way that the inputted image can have a tree-structured hierarchical layer divided construction. The encoding device and the decoding device in accordance with this Embodiment 1 can also support such a sub-macroblock structure. However, in this Embodiment 1, an example in which the motion-compensated prediction unit 2 uses the prediction image generating method in accordance with the motion prediction mode A and the prediction image generating method in accordance with the motion prediction mode B as the prediction image generating method at the time of generating a prediction image while limiting the motion prediction mode to a case equivalent to mc_mode0 of FIG. 2 in which one motion vector is allocated to each macroblock will be explained. In order to support such the hierarchical layer divided construction having sub-macroblocks as mentioned above, what is necessary is just to apply both the motion prediction mode A and the motion prediction mode B to each motion vector allocation unit block.

When the inputted picture encoding method control information shows that "normal picture encoding is to be carried out" (step ST1 of FIG. 8), the motion-compensated prediction unit 2 generates a prediction image A in the motion prediction mode A, and also generates a prediction image B in the motion prediction mode B (step ST2). In contrast, when the inputted picture encoding method control information shows that "skip picture encoding is to be carried out" (step ST1), the motion-compensated prediction unit 2 does not generate a prediction image A in the motion prediction mode A, but generates a prediction image B in the motion prediction mode B (step ST3).

(1) Generation of a Prediction Image A in the Motion Prediction Mode A

The motion-compensated prediction unit 2 selects one frame of reference image from the one or more frames of reference image for motion-compensated prediction which are stored in the frame memory 10, and searches for a motion vector through the macroblock to be encoded and the reference image (searches for a motion vector in a predetermined motion search range on the reference image). The motion-compensated prediction unit then carries out a motion-compensated prediction process using the motion vector to generate a prediction image A (generates a prediction image A by using an image area which is displaced from the position in the screen of the macroblock to be encoded by the motion vector).

(2) Generation of a Prediction Image B in the Motion Prediction Mode B

The motion-compensated prediction unit 2 generates an estimated vector of the macroblock to be encoded from the motion vectors of already-encoded macroblocks stored in the motion parameter memory 1, and carries out a motion-compensated prediction process using the estimated vector to generate a prediction image B. As the motion prediction mode B, for example, a prediction image generating method based on the direct prediction for use in standard encoding methods, such as MPEG-4 visual (ISO/IEC 14496-2) and MPEG-4 AVC/ITU-T H.264 (referred to as "AVC" from here on), can be used.

In accordance with the prediction image generating method based on the direct prediction for use in AVC, a B picture which enables a prediction using a maximum of two motion vectors for a block to which one motion vector can be allocated can be used, and the following two types of modes: a time direct mode and a space direct mode are prepared. In the time direct mode, the motion vector of another already-encoded picture is referred to and a scaling process is carried out on the motion vector in accordance with a time difference between the already-encoded picture and the picture to be encoded to calculate a motion vector (direct vector) which is to be used for the macroblock to be encoded. In contrast, in the space direct mode, the motion vector of at least one already-encoded macroblock located around the macroblock to be encoded is referred to, and a motion vector (direct vector) which is to be used for the macroblock to be encoded is calculated. In the direct prediction for use in AVC, either the time direct mode or the space direct mode is selected for each slice.

Figure 3:
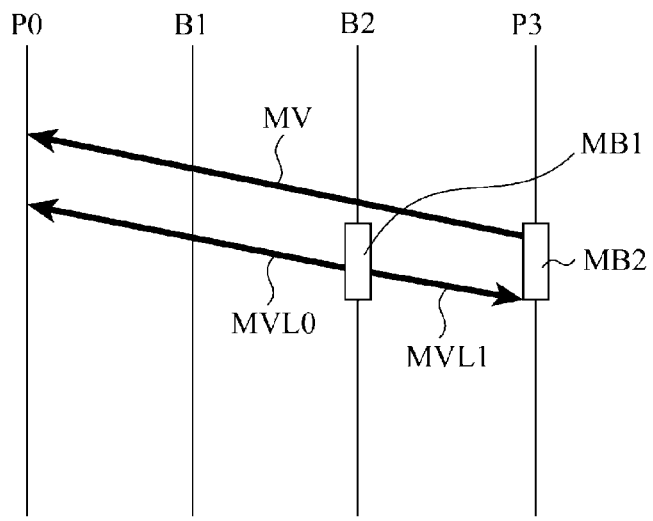
FIG. 3 is a schematic diagram showing a calculating method of calculating a direct vector in a time direct mode.

FIG. 3 is a schematic diagram showing a method of calculating a direct vector in the time direct mode. In FIG. 3, "P" shows a P picture and "B" shows a B picture. A P picture enables a prediction using one motion vector for a block to which one motion vector can be allocated. Numerals 0 to 3 show the display order of pictures, and also show that the corresponding pictures are display images at times T0, T1, T2, and T3, respectively. It is assumed that an encoding process of encoding a picture is carried out in order of P0, P3, B1, and B2.

For example, a case in which a macroblock MB1 in the picture B2 is encoded in the time direct mode is assumed. In this case, the motion vector MV of a macroblock MB2 which is spatially located at the same position as the macroblock MB1, and which is the motion vector of the picture P3 nearest to the picture B2, the picture P3 being included in the already-encoded pictures located behind the picture B2 on the time axis, is used. This motion vector MV refers to the picture P0 (the motion vector MV is acquired as the result of searching for the picture P0 as a reference image), and motion vectors MVL0 and MVL1 which are used when encoding the macroblock MB1 are calculated in accordance with the following equation (1).

$$MVL0 = \frac{T2-T0}{T3-T0} \times MV \qquad (1)$$
$$MVL1 = \frac{T2-T3}{T3-T0} \times MV$$

Therefore, because one screenful of the motion vectors MV of already-encoded pictures is needed in order to determine the motion vector of the macroblock to be encoded in the time direct mode, the motion parameter memory 1 for holding the motion vectors MV is needed. The storage of the motion vectors in the motion parameter memory 1 is carried out in such a way that when encoding a P picture or a picture which is to be used as a reference image for a subsequent motion-compensated prediction, one screenful of the motion vectors used for the encoding are stored one after another, as shown in FIG. 3.

Figure 4:
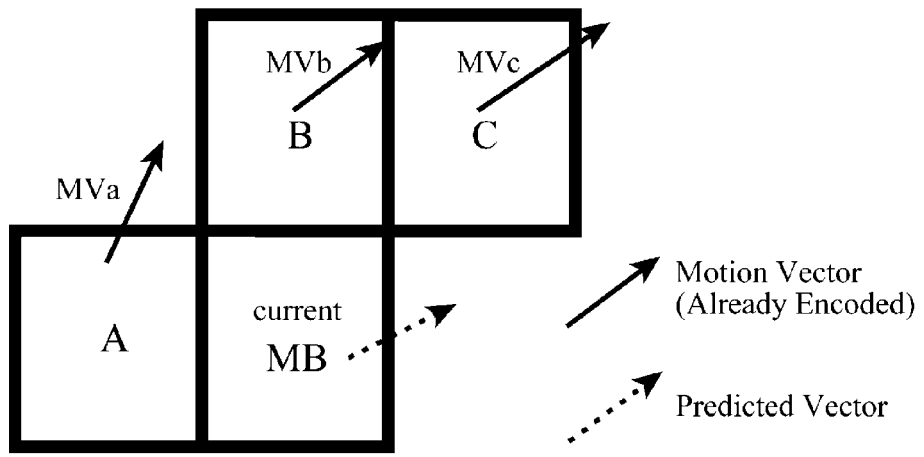
FIG. 4 is a schematic diagram showing an estimating method of estimating a motion vector in a space direct mode.

FIG. 4 is a schematic diagram showing a method of estimating a motion vector in the space direct mode. In FIG. 4, currentMB shows the macroblock to be encoded. At this time, when the motion vector of an already-encoded macroblock A located to the left of the macroblock to be encoded is expressed as MVa, the motion vector of an already-encoded macroblock B located above the macroblock to be encoded is expressed as MVb, and the motion vector of an already-encoded encoded macroblock C located to the right of and above the macroblock to be encoded is expressed as MVc, the motion vector MV of the macroblock to be encoded can be estimated by determining the median of these motion vectors MVa, MVb, and MVc, as shown in the following equation (2).

$$MV = \text{median}(MVa, MVb, MVc) \qquad (2)$$

Also in the case of the space direct mode, it is necessary to hold the motion vectors MV of already-encoded macroblocks and so on in the motion parameter memory 1. Hereafter, in this Embodiment 1, it is assumed the motion prediction mode B is this direct prediction mode for use in AVC.

When receiving the prediction images A and B respectively generated in the prediction modes A and B from the motion-compensated prediction unit 2, the subtractor 3 subtracts the prediction image A from the image of the macroblock to be encoded, and outputs a prediction difference signal showing a difference image A which is the result of the subtraction to the encoding mode determining unit 4. The subtractor also subtracts the prediction image B from the image of the macroblock to be encoded, and outputs a prediction difference signal showing a difference image B which is the result of the subtraction to the encoding mode determining unit 4 (step ST4). However, when the picture encoding method control information shows that "skip picture encoding is to be carried out", the subtractor does not carry out the processes of calculating the difference images.

When the picture encoding method control information shows that "normal picture encoding is to be carried out", the encoding mode determining unit 4 uses the prediction difference signals showing the difference images A and B outputted from the subtractor 3 to calculate rate distortion costs J as evaluated degrees of efficiency of encoding of the difference images A and B, respectively (step ST5).

$$J = D + \lambda R \qquad (3)$$

where "λ" is a positive constant.

"D" is the sum of absolute values in the macroblock of the prediction difference signal showing the difference image A or the prediction difference signal showing the difference image B. As an alternative, the distortion sum of squared differences between the local decoded prediction difference signal outputted from the local decoding unit 6 and the image of the inputted macroblock can be used as "D" when the prediction difference signal showing the difference image A or the prediction difference signal showing the difference image B is outputted to the compressing unit 5. A code amount (or an estimated value of the code amount) is used as "R" when the prediction difference signal showing the difference image A or the prediction difference signal showing the difference image B, and the prediction parameters corresponding to those prediction difference signals are encoded.

After calculating rate distortion costs J as the evaluated degrees of efficiency of encoding of the difference images A and B, the encoding mode determining unit 4 selects the difference image which provides a smaller one of the rate distortion costs J from the difference images A and B, and outputs the prediction difference signal showing the difference image to the compressing unit 5 (step ST6). For example, when the rate distortion cost J of the difference image A is smaller than that of the other difference image, the encoding mode determining unit outputs the prediction difference signal showing the difference image A to the compressing unit 5, and stores the prediction parameters (the motion prediction mode A, the motion vector, and the identification number of the reference image) used for the generation of the prediction image A in the motion prediction mode A in the motion parameter memory 1 while outputting the prediction parameters to the variable length encoding unit 11. In contrast, when the rate distortion cost J of the difference image B is smaller than that of the other difference image, the encoding mode determining unit outputs the prediction difference signal showing the difference image B to the compressing unit 5, and stores the prediction parameters (the motion prediction mode B, the direct vector, and the identification number of the reference image) used for the generation of the prediction image B in the motion prediction mode B in the motion parameter memory 1 while outputting the prediction parameters (the motion prediction mode B and the identification number of the reference image) to the variable length encoding unit 11. When the electric power of the prediction difference signal showing the difference image B calculated from the prediction image B generated in the motion prediction mode B is not zero, the encoding mode determining unit 4 outputs the prediction difference signal to the compressing unit 5 in order to encode the non-zero transform coefficients (compressed data) acquired through the DCT process and the quantization process.

When the picture encoding method control information shows that "skip picture encoding is carried out", the encoding mode determining unit 4 always outputs a prediction difference signal having a zero value. More specifically, even when the electric power of the prediction difference signal showing the difference image B outputted from the subtractor 3 is not zero, the encoding mode determining unit 4 forcedly replaces the prediction difference signal by a zero value and outputs the prediction difference signal having a zero value to the compressing unit 5 (step ST7). As an alternative, the image encoding device can be constructed in such a way that the encoding mode determining unit 4 skips the process, and the compressing unit 5 and the local decoding unit 6 generate a prediction difference signal of all zeros internally when the picture encoding method control information shows that "skip picture encoding is carried out". The encoding mode determining unit also stores the prediction parameters (the motion prediction mode B, the direct vector, and the identification number of the reference image) used for the generation of the prediction image B in the motion prediction mode B in the motion parameter memory 1.

An amount of distortion, which is acquired as a result of forcedly making the prediction difference signal have a zero value, is calculated, and the rate distortion cost J of each macroblock in the case in which the picture encoding method control information shows that "skip picture encoding is to be carried out" is made to be substantially equal to "D" showing the amount of distortion which is acquired as the result of forcedly making the prediction difference signal have a zero value. Further, although the code amount at the time that the prediction difference signal and the prediction parameters are encoded is used as "R", as mentioned above, the code amount of the prediction parameters is assumed to be zero because the motion vectors of already-encoded macroblocks stored in the motion parameter memory 1 are referred to (the image decoding device refers to the motion vectors of already-decoded macroblocks stored in the motion parameter memory 21), and a direct vector is calculated in accordance with a procedure for the direct prediction for use in AVC. Further, because the prediction difference signal is forcedly made to have a zero value, the code amount of the prediction difference signal is also assumed to be zero. Therefore, the code amount required to encode the macroblock to be encoded is assumed to be zero, and the cost J has a value substantially equal to "D".

When receiving the prediction difference signal from the encoding mode determining unit 4, the compressing unit 5 calculates DCT coefficients by carrying out a DCT process on the prediction difference signal, and also quantizes the DCT coefficients and outputs compressed data (including the quantization parameters used at the time of quantizing the DCT coefficients) which are the DCT coefficient quantized thereby to the local decoding unit 6 and the variable length encoding unit 11 (step ST8). However, when the picture encoding method control information shows that "skip picture encoding is to be carried out", the compressing unit 5 can skip the process because the prediction difference signal of all zeros is provided from the encoding mode determining unit 4 (step ST9). As an alternative, the compressing unit can receive the picture encoding method control information, and forcedly output a zero value by itself.

When receiving the compressed data from the compressing unit 5, the local decoding unit 6 inverse-quantizes the compressed data by using the quantization parameters included in the compressed data to acquire the DCT coefficients, and carries out an inverse DCT process on the DCT coefficients to calculate a local decoded prediction difference signal corresponding to the prediction difference signal outputted from the encoding mode determining unit 4 (step ST8). The local decoding unit 6 can be alternatively constructed in such a way as to skip the process when the picture encoding method control information shows that "skip picture encoding is to be carried out" because the compressed data with all zero values are provided from the compressing unit 5 (step ST9). As an alternative, the local decoding unit can forcedly output a zero value by itself in response to the picture encoding method control information.

When the picture encoding method control information shows that "normal picture encoding is to be carried out", the selection switch 7 selects the local decoded prediction difference signal calculated by the local decoding unit 6, and outputs this local decoded prediction difference signal to the adder 8. In contrast, when the picture encoding method control information shows that "skip picture encoding is to be carried out", the selection switch selects the data with all zero values and outputs this data to the adder 8 (step ST9). The adder 8 adds the local decoded prediction difference signal or the data with all zero values selected by the selection switch 7, and the prediction signal showing the prediction image (the prediction image associated with the difference image which provides the highest degree of encoding efficiency) generated by the motion-compensated prediction unit 2 to generate a local decoded image signal showing the local decoded image (steps ST8 and ST9).

When the picture encoding method control information shows that "normal picture encoding is to be carried out", the loop filter 9 carries out a distortion compensation process of compensating for the encoding distortion included in the local decoded image generated by the adder 8 by using a block distortion removal filter (deblocking filter) for a DCT block boundary (step ST10). In contrast, when the picture encoding method control information shows that "skip picture encoding is to be carried out", because the prediction image is inputted direct to the loop filter 9 from the adder unit 8, the loop filter carries out a motion block boundary smoothing process of smoothing the discontinuity at a block boundary (a macroblock boundary in the motion prediction mode B) which occurs in the motion vector allocation region of the prediction image (step ST11). A loop filtered image (the local decoded image filtered) outputted from the loop filter 9 is stored in the frame memory 10 as a reference image. In accordance with this Embodiment 1, an overlap motion compensation process at a macroblock boundary is used as the motion block boundary smoothing process in the loop filter 9.

FIG. 5 is an explanatory drawing showing the overlap motion compensation process. A macroblock X shown in FIG. 5(a) is the one which is the current target to be processed, and macroblocks A, B, C, and D are the ones located at positions surrounding the macroblock X. The motion block boundary smoothing process in accordance with this Embodiment 1 is based on the assumption that the process is carried out on each frame, and it is assumed that at a time of carrying out the smoothing process on the macroblock X, the macroblocks A, B, C, and D located around the macroblock X are also already in a state in which motion vectors MVL0 and MVL1 are determined similarly. By using this fact, image data as will be shown below are reproduced for block boundary areas X0 to X3 in the macroblock X shown in FIG. 5(b).

Area $X0 (i=A)$:
$$I'_0(x, y) = w_0 I(x, y) + (1 - w_0) I(x + u0, y + v0)$$
$$I'_1(x, y) = w_1 I(x, y) + (1 - w_1) I(x + u0, y + v0)$$
$$I'(x, y) = [I'_0(x, y) + I'_1(x, y)]/2$$

Area $X1 (i=B)$:
$$I'_2(x, y) = w_2 I(x, y) + (1 - w_2) I(x + u0, y + v0)$$
$$I'_3(x, y) = w_3 I(x, y) + (1 - w_3) I(x + u0, y + v0)$$
$$I'(x, y) = [I'_2(x, y) + I'_3(x, y)]/2$$

Area $X2 (i=C)$:
$$I'_4(x, y) = w_4 I(x, y) + (1 - w_4) I(x + u0, y + v0)$$
$$I'_5(x, y) = w_5 I(x, y) + (1 - w_5) I(x + u0, y + v0)$$
$$I'(x, y) = [I'_4(x, y) + I'_5(x, y)]/2$$

Area $X3 (i=D)$:
$$I'_6(x, y) = w_6 I(x, y) + (1 - w_6) I(x + u0, y + v0)$$
$$I'_7(x, y) = w_7 I(x, y) + (1 - w_7) I(x + u0, y + v0)$$
$$I'(x, y) = [I'_6(x, y) + I'_7(x, y)]/2$$

$u0_i$=horizontal component of $MVL0_i$
$v0$=vertical component of $MVL0_i$ (i: A, B, C, or D)
$u1_i$=horizontal component of $MVL1_i$
$v1$=vertical component of $MVL1_i$ (i: A, B, C, or D)
I(x, y): pixel value at pixel position (x, y)
I'(x, y): pixel value at pixel position (x, y) on which overlap motion compensation process is carried out
w0 to w4: Weight parameters The weight parameters w0 to w4 are defined in accordance with each pixel position in the macroblock, as shown in, for example, FIGS. 12 and 13 (in the case in which each macroblock is a block of 16×16 pixels). By carrying out the smoothing process using these weights, only the motion block boundaries in the macroblock X are made to be the target for the smoothing process, and the motion vector of an appropriate macroblock located around the macroblock X is taken into consideration in accordance with the positions of the boundaries. Further, multiplication and division can be carried out on each weight value shown in the figures through bit shift operations, and can be implemented by a process whose required amount of computation is suppressed. In a case in which the inputted image is a color image which consists of brightness signals and color difference signals (or RGB or the like), and blocks of different colors are also included in each macroblock, this smoothing process is carried out on each color block by using weight parameters which are determined in accordance with the characteristics of each color component. Further, when the macroblock size is variable, an area which defines a non-zero weight in each of the areas X0 to X3 can be constructed in such a way as to be set in accordance with the size of the macroblock.

Because the values of pixels in the vicinity of the center of the macroblock X are hard to be affected by the motion vectors of the surrounding macroblocks A, B, and C and D when the macroblock size is large, there is a possibility that the above-mentioned overlap motion compensation process carried out on the entire region of the macroblock causes an unreasonable distortion in the pixel values. Therefore, when the macroblock size is large, the overlap motion compensation process can be carried out in such a way as to be targeted only on a pixel which is closer to a macroblock boundary. As an alternative, the weight parameters can be designed in such a way that the weight depending on the value of a peripheral motion vector on the vicinity of the center of the macroblock X becomes small in accordance with the macroblock size. As an alternative, the image encoding device can control the weight parameters to optimal values, and the variable length encoding unit 11 can encode the weight parameter to multiplex these parameters into the bitstream.

For example, in a case in which the inputted image does not have so many complicated movements and most of the boundaries of the macroblock are not in a discontinuous state, it can be considered that it is more desirable to determine the weight parameters in such a way that the influence of the surrounding macroblocks is reduced as much as possible. In contrast, because there are increasing cases in which a boundary of the macroblock is in a discontinuous state when the inputted image has many complicated movements, it can be considered that it is more desirable to determine the weight parameters in such a way that the influence of the surrounding macroblocks is taken into consideration as much as possible. Because this state is changed in accordance with the characteristics of the video signal, the encoding bit rate, etc. in the encoding process, the degree of encoding efficiency can be improved as long as the image encoding device can control the weight parameters to optimal values. Units in which to encode the weight parameters can be units of one picture or units of one slice which is a collection of two or more macroblocks.

As the results of the above-mentioned processes, the encoding device can acquire both the local decoded image and the picture code amount in the case in which "normal picture encoding is to be carried out", and the local decoded image and the picture code amount (can be assumed to be nearly zero) in the case in which "skip picture encoding is to be carried out" by controlling each of the components by using the picture encoding method control information. Therefore, the encoding device calculates the rate distortion cost of the picture from each of both the process results (steps ST12 and ST13), and uses the encoding method which provides a smaller calculated cost for the encoding of the picture currently being processed (step ST14).

When that "normal picture encoding is to be carried out" is selected as the result of the above-mentioned cost comparison, the variable length encoding unit 11 entropy-encodes the compressed data outputted from the compressing unit 5 (including the quantization parameters used at the time of quantizing the DCT coefficients), the prediction parameters outputted from the encoding mode determining unit 4 (the motion prediction mode, the motion vector, the identification number of the reference image), and the picture encoding method control information to generate a bitstream (encoded data) showing the encoded result, and outputs the bitstream (step ST10). When the encoding mode determining unit 4 has selected the difference image A, the variable length encoding unit 11 entropy-encodes the prediction parameters including the motion vector, whereas when the encoding mode determining unit 4 has selected the difference image B, the variable length encoding unit 11 entropy-encodes the prediction parameters which do not include the motion vector (direct vector). In contrast, when that "skip picture encoding is to be carried out" is selected as the result of the above-mentioned cost comparison, the variable length encoding unit 11 only encodes the picture encoding method control information, but does not multiplex any macroblock-level encoded data into the bitstream. However, when adaptively changing the weight parameters to carry out the encoding, the variable length encoding unit multiplexes the weight parameter values into the bitstream in units of change in the weight parameter values.

Although the image encoding device in accordance with this Embodiment 1 is constructed in such a way as to carry out encoding and an efficiency evaluation on the target picture both in the case in which "normal picture encoding is to be carried out" and in the case in which "skip picture encoding is to be carried out", and, after that, select the encoding method which provides a smaller rate distortion cost and then encode the target picture, as mentioned above, the encoding procedure is not limited to this two pass encoding. For example, the image encoding device can be constructed in such a way as to separately hold the motion parameters of all the macroblocks which are acquired as the result of having evaluated the motion prediction mode B because the prediction process corresponding to the motion prediction mode B which is to be used also in the case in which "skip picture encoding is carried out" has been carried out in the processing procedure for "carrying out normal picture encoding", and to enable results in the case in which "normal picture encoding is to be carried out" and results in the case in which "skip picture encoding is to be carried out" to be acquired simultaneously when the local decoded image reaches the loop filter 9. Further, although not illustrated in the figures, the image encoding device can be constructed in such a way as to acquire activity information for determining whether adequate encoding performance can be achieved by "carrying out skip picture encoding" on a per-picture basis in advance, and then determine whether or not to evaluate the process of "carrying out skip picture encoding" on the picture currently being processed on the basis of the activity information. For example, the image encoding device grants a permission to "carry out skip picture encoding" only when the frame rate is higher than a predetermined value, grants a permission to "carry out skip picture encoding" only when a simple difference between adjacent frames is equal to or smaller than a predetermined threshold (when a movement between frames is relatively small), or grants a permission to "carry out skip picture encoding" only when a simple difference between adjacent frames, which is determined from the motion parameters acquired from the results of previous inter-frame predictive encoding, and the code amount of the prediction difference signal, is equal to or smaller than a predetermined threshold. As a result, the image encoding device can carry out the encoding while suppressing the amount of computation without carrying out the two pass encoding process and evaluation.

Figure 6:
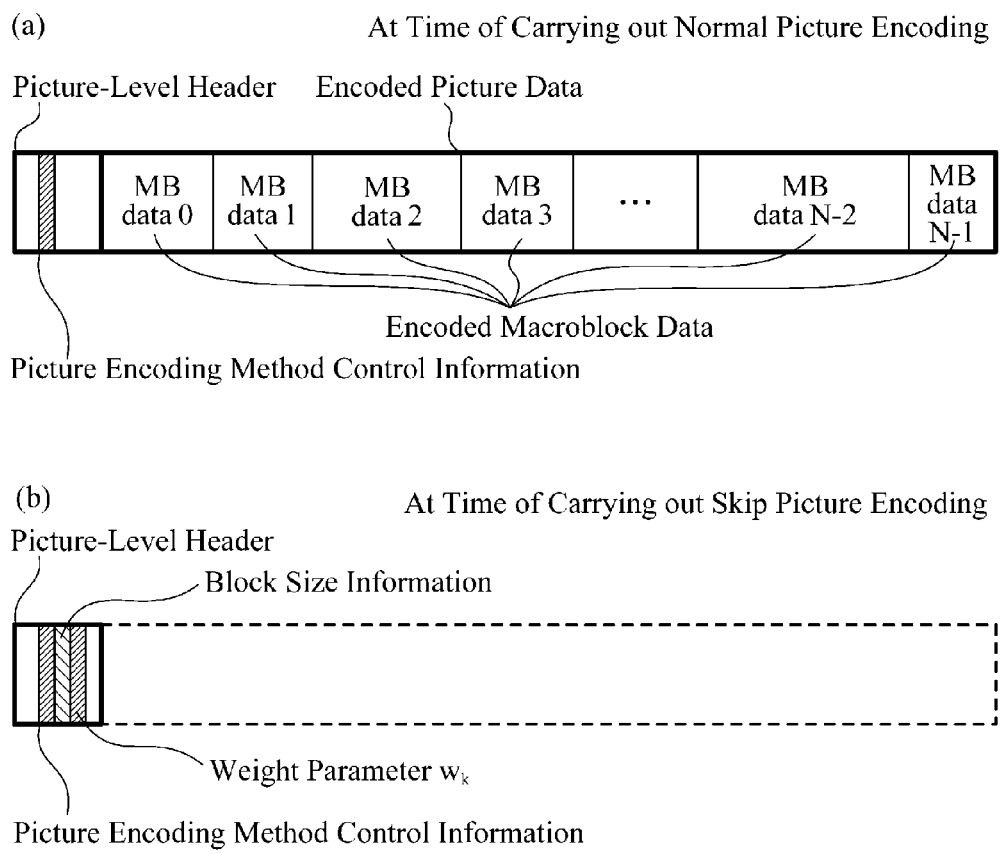
FIG. 6 is an explanatory drawing showing a bitstream outputted from a variable length encoding unit 11.

FIG. 6 is an explanatory drawing showing the bitstream outputted from the variable length encoding unit 11. This figure particularly shows an encoded picture data portion. When the picture encoding method control information shows that "normal picture encoding is to be carried out", the variable length encoding unit 11 generates and outputs a bitstream into which the encoded data about the plurality of macroblocks in the picture (the data about the compressed data encoded, and the prediction parameters), as well as picture-level header data, are inserted, as shown in FIG. 6(*a*). In contrast, when the picture encoding method control information shows that "skip picture encoding is to be carried out", the variable length encoding unit does not multiplex the encoded data about the macroblocks (the data about the compressed data encoded) into the bitstream, as shown in FIG. 6(*b*). However, although not clearly shown in FIG. 6(*b*), the encoded data about the macroblocks (the prediction parameters showing the motion prediction mode and the identification number of the reference image) are multiplexed into the bitstream. Because the motion compensation unit 24 of the image decoding device generates a direct vector independently in the direct prediction for use in AVC, the direct vector generated by the motion-compensated prediction unit 2 is not included in the prediction parameters, and therefore is not multiplexed into the bitstream.

This is because, when carrying out skip picture encoding, the image encoding device estimates a motion vector (direct vector) for each of all the macroblocks from the motion vectors of already-encoded macroblocks, and generates a decoded image from a prediction image which the image decoding device has generated using the motion vector, as mentioned above, and therefore the image decoding device can generate a prediction image in accordance with the same method as that which the image encoding device uses and generate a decoded image from the prediction image even if there are no macroblock-level encoded data. However, in order for the image decoding device to be able to determine whether either normal picture encoding or skip picture encoding has been carried out, the variable length encoding unit 11 multiplexes the picture encoding method selection information inputted to the image encoding device into the picture-level header data. Further, when the image encoding device controls the weight parameters w0 to w7 for the overlap motion compensation process to optimal values, the variable length encoding unit 11 multiplexes the weight parameters w0 to w7 into the picture-level header data.

In this Embodiment 1, the example in which the image encoding device selects either the normal picture encoding or the skip picture encoding on a per-picture basis is shown, the image encoding device can alternatively select either the normal picture encoding or the skip picture encoding on a per-slice basis, a slice defining a particular partial area in the screen. In this case, the image encoding device is constructed in such a way as to separately carry out the processing for each slice, and the picture encoding method selection information can be multiplexed into slice-level header data as slice encoding method selection information and the weight parameters w0 to w4 can also be multiplexed into the slice-level header data. Further, in this Embodiment 1, although the example in which the motion prediction mode B in the case of carrying out the normal picture encoding is applied similarly to the case of carrying out the skip picture encoding is shown, it is not necessary to necessarily limit units in which the direct vector is determined to units of one macroblock because the encoded data about the picture currently being processed is not multiplexed into the bitstream at all when the skip picture encoding is carried out. Because no codes of motion vectors are generated in the case of encoding a skip picture even if the block size of each unit to which a motion vector is allocated becomes small, an improvement in this flexibility can provide an improvement in the degree of encoding efficiency of the skip picture. For example, the encoding device and the decoding device can be constructed in such a way as to determine the block size in the case of carrying out the skip picture encoding under a common rule in accordance with the size of the inputted image and the size of each macroblock. The encoding device can be constructed in such a way as to encode the block size in the case of carrying out the skip picture encoding to multiplex the encoded block size into the picture-level header and transmit this encoded block size to the decoding device (units in which this encoding is carried out are not limited to units of one picture, and the encoding can be carried out in units of one slice (on a per-slice basis)).

In this Embodiment 1, although the example in which a motion vector (direct vector) is estimated on a per-macroblock basis and the overlap motion compensation process by the loop filter 9 is applied when the motion prediction mode B is used is shown, it is needless to say that the overlap motion compensation process by the loop filter 9 can be applied even when units in which a motion vector is estimated in the motion prediction mode are units of one subblock or the like. In addition, as the motion block boundary smoothing process, a process of calculating activity values in accordance with the size of the motion vector, a difference in the identification number of the reference image, an amount of pixel displacement at a boundary, etc. for each motion vector allocation block boundary, and performing smoothing filtering on a pixel which is adjacent to the boundary in accordance with those activity values can be introduced.

As can be seen from the above description, the image encoding device in accordance with this Embodiment 1 is constructed in such a way that the image encoding device includes the encoding mode determining unit 4 for evaluating the degree of efficiency of encoding of a difference image A which is the difference between the image of the macroblock to be encoded, and a prediction image A generated by the motion-compensated prediction unit 2 in the motion prediction mode A while evaluating the degree of efficiency of encoding of a difference image B which is the difference between the image of the macroblock to be encoded, and a prediction image B generated by the motion-compensated prediction unit 2 in the motion prediction mode B to select the difference image having a higher degree of encoding efficiency from the difference images, and the compressing unit 5 for carrying out a DCT process and a quantization process on a prediction difference signal showing the difference image selected by the encoding mode determining unit 4 to generate compressed data (including quantization parameters), and the variable length encoding unit 11 entropy-encodes the compressed data outputted from the compressing unit 5 (including the quantization parameters used at the time of quantizing DCT coefficients), prediction parameters outputted from the encoding mode determining unit 4, and picture encoding method control information to generate a bitstream. Therefore, the image encoding device can provide adequate encoding quality in the encoding process. As a result, there is provided an advantage of being able to improve the quality of a reproduced image acquired by the image decoding device with a comparable code amount as compared with a conventional example in which an image decoding device estimates a motion vector to generate an interpolated frame independently of an image encoding device.

More specifically, when the prediction image B is generated in the motion prediction mode B of encoding a skip picture, the code amount can be reduced greatly as compared with the case in which the prediction image A is generated in the motion prediction mode A of carrying out the normal picture encoding because it is not necessary to multiplex the encoded picture data (the compressed data encoded) into the bitstream, while even when adequate quality cannot be ensured through the use of the prediction image B generated in the motion prediction mode B, the encoding quality can be maintained because the prediction image A generated in the motion prediction mode A can be used.

As a case in which the motion prediction mode B of encoding a skip picture can be used, there is a case in which in the direct prediction, an image having adequate quality can be reproduced only by smoothing the discontinuity at a block boundary which occurs in the motion vector allocation region of the prediction image. For example, in a case in which the frame rate is high and there is a very small amount of movement between frames, the data volume of signaling can be reduced to smaller than that at a time of transmitting control information about macroblock skips for each macroblock, the control information showing that the prediction difference signal is zero. Particularly in a case in which the video resolution is high and the number of macroblocks in the picture increases, the advantage of reducing the code amount of the control information is enhanced.

Further, because the encoding mode determining unit 4 in accordance with this Embodiment 1 is constructed in such a way as to forcedly replace the prediction error signal showing the difference image B which is the difference between the image of the macroblock to be encoded and the prediction image B generated in the motion prediction mode B with zero values when the picture encoding method control information shows that "skip picture encoding is to be carried out", there is provided an advantage of being able to reduce the code amount required to encode the macro block to be encoded to approximately zero, and reduce the code amount of the bitstream greatly.

Because the compressing unit 5 in accordance with this Embodiment 1 is constructed in such a way as to output the prediction error signal (signal with all zero values) showing the difference image B which is the difference between the image of the macro block to be encoded, and the prediction image B generated in the motion prediction mode B to the variable length encoding unit 11 without carrying out the DCT process and the quantization process on the prediction error signal (signal with all zero values) when the picture encoding method control information shows that "skip picture encoding is to be carried out", there is provided an advantage of being able to reduce the amount of information to be processed of the image encoding device.

Further, because the loop filter 9 in accordance with this Embodiment 1 is constructed in such a way as to carry out a distortion compensation process of compensating for an encoding distortion included in a local decoded image when the picture encoding method control information shows that "normal picture encoding is to be carried out", and to carry out a block boundary smoothing process of smoothing the discontinuity existing at a boundary between blocks when the picture encoding method control information shows that "skip picture encoding is to be carried out", there is provided an advantage of being able to improve the quality of the local decoded image even in any one of the motion prediction modes A and B.

Because the local decoding unit 6 in accordance with this Embodiment 1 is constructed in such a way as to handle the prediction image B generated by the motion-compensated prediction unit 2 as a local decoded image without carrying out an inverse quantization process and an inverse DCT process on the compressed data outputted from the compressing unit 5 when the picture encoding method control information shows that "skip picture encoding is to be carried out", there is provided an advantage of being able to reduce the amount of information to be processed of the image encoding device.

Next, the processing carried out by the image decoding device will be explained. When receiving the bitstream outputted from the image encoding device shown in FIG. 1, the variable length decoding unit 22 analyzes the picture-level header data in the bitstream and then decodes the picture-level header data to acquire the picture encoding method selection information (step ST11 of FIG. 9). When the picture encoding method control information shows that "normal picture encoding is to be carried out" (step ST12), the variable length decoding unit 22 carries out an entropy decoding process on the encoded macroblock data located behind the picture-level header data to decode the plurality of compressed data about the macroblocks in the picture (including the quantization parameters used at the time of quantizing the DCT coefficients) and the prediction parameters (step ST13). The compressed data (including the quantization parameters used at the time of quantizing the DCT coefficient) decoded by the variable length decoding unit 22 are outputted to the prediction error decoding unit 23, and the prediction parameters decoded by the variable length decoding unit 22 are outputted to the motion compensation unit 24.

When the picture encoding method control information shows that "skip picture encoding is to be carried out" (step ST12), the variable length decoding unit 22 analyzes the picture-level header data and, when the weight parameters w0 to w4 and the information about the motion vector allocation block size which is the target for processing in the motion prediction mode B are multiplexed into the bitstream, decodes the weight parameters w0 to w4 and the information about the motion vector allocation block size. The variable length decoding unit further carries out an entropy decoding process on the encoded macroblock data located behind the picture-level header data to decode the prediction parameters of the plurality of macroblocks in the picture (step ST14). The prediction parameters and the weight parameters w0 to w4 which are decoded by the variable length decoding unit 22 are outputted to the motion compensation unit 24. The picture encoding method selection information decoded by the variable length decoding unit 22 is outputted to the motion compensation unit 24, the selection switch 25, and the loop filter 27.

When receiving the compressed data from the variable length decoding unit 22, the prediction error decoding unit 23 inverse-quantizes the compressed data to calculate DCT coefficients by using the quantization parameters included in the compressed data, like the local decoded section 6 shown in FIG. 1, and carries out an inverse DCT process on the DCT coefficients to calculate a prediction error signal decoded value showing a difference image (i.e. a signal corresponding to the prediction difference signal outputted from the encoding mode determining unit 4 shown in FIG. 1) (step ST15).

When the picture encoding method control information shows that "normal picture encoding is to be carried out", the selection switch 25 selects the prediction error signal decoded value calculated by the prediction error decoding unit 23, and outputs the prediction error signal decoded value to the adder 26 (step ST16). In contrast, when the picture encoding method control information shows that "skip picture encoding is to be carried out", the selection switch selects all zero values and outputs these all zero values to the adder 26 (step ST17).

When receiving the prediction parameters from the variable length decoding unit 22, the motion compensation unit 24 reads the reference image shown by the identification number in the prediction parameters from one or more frames of reference image stored in the frame memory 28. When the picture encoding method control information shows that "normal picture encoding is to be carried out", and the motion prediction mode in the prediction parameters outputted from the variable length decoding unit 22 is the motion prediction mode A (step ST18), the motion compensation unit 24 generates a prediction image A in the motion prediction mode A, like the motion-compensated prediction unit 2 shown in FIG. 1 (step ST19). However, unlike the motion-compensated prediction unit 2 shown in FIG. 1, the motion compensation unit 24 uses the motion vector in the prediction parameters outputted from the variable length decoding unit 22 without carrying out a search process of searching for a motion vector by itself. In contrast, when the motion prediction mode in the prediction parameters outputted from the variable length decoding unit 22 is the motion prediction mode B (step ST18), the motion compensation unit generates a prediction image B in the motion prediction mode B, like the motion-compensated prediction unit 2 shown in FIG. 1 (step ST20).

More specifically, the motion compensation unit 24 generates a direct vector of the macroblock to be decoded from the motion vectors of already-decoded macroblocks stored in the motion parameter memory 21, and carries out a motion-compensated prediction process using the direct vector to generate a prediction image B. After generating a prediction image of the macroblock currently being processed, in order to prepare for generation of a prediction image of the next macroblock in the motion prediction mode B, the motion compensation unit 24 stores one screenful of the motion vector (direct vector) and the related information (the motion prediction mode B, the identification number of the reference image, the amount of prediction error, etc.) which have been used for the generation of the prediction image of the macroblock currently being processed in the motion parameter memory 21. When the picture encoding method control information shows that "skip picture encoding is to be carried out", the motion compensation unit 24 generates a prediction image B in the motion prediction mode B, like the motion-compensated prediction unit 2 shown in FIG. 1 (step ST21).

When the prediction error signal decoded value is selected by the selection switch 25, the adder 26 adds the prediction error signal decoded value and the prediction signal showing either the prediction image A or the prediction image B generated by the motion compensation unit 24 to generate a decoded image signal showing a decoded image (step ST22). In contrast, when the all zero values are selected by the selection switch 25, the adder 26 adds the all zero values and the prediction signal showing the prediction image B generated by the motion compensation unit 24 to generate a decoded image signal showing a decoded image (step ST23).

When the picture encoding method control information shows that "normal picture encoding is to be carried out", the loop filter 27 carries out a distortion compensation process of compensating for an encoding distortion included in the decoded image generated by the adder 26 by using a block distortion removal filter (deblocking filter) for a DCT block boundary, like the loop filter 9 shown in FIG. 1 (step ST24). In contrast, when the picture encoding method control information shows that "skip picture encoding is to be carried out", the loop filter carries out a motion block boundary smoothing process of smoothing the discontinuity at a block boundary (a motion prediction mode B macroblock boundary) which occurs in the motion vector allocation region of the prediction image, like the loop filter 9 shown in FIG. 1 (step ST25). The reproduced image outputted from the loop filter 27 (the decoded image filtered) is stored as a reference image in the frame memory 28.

As can be seen from the above description, the image decoding device in accordance with this Embodiment 1 is constructed in such a way as to include the motion compensation unit 24 for generating a prediction image A in the motion prediction mode A by using the motion vector decoded by the variable length decoding unit 22 when the picture encoding method control information decoded by the variable length decoding unit 22 shows that "normal picture encoding is to be carried out", and for generating a prediction image in the motion prediction mode B when the picture encoding method control information decoded by the variable length decoding unit 22 shows that "skip picture encoding is to be carries out", and to add the prediction image generated by the motion compensation unit 24 and the difference image outputted from the prediction error decoding unit 23 to generate a decoded image corresponding to the inputted image inputted to the image encoding device. Therefore, there is provided an advantage of being able to reproduce an image having high quality from the bitstream transmitted from the image encoding device.

Further, because the image decoding device in accordance with this Embodiment 1 is constructed in such a way that the loop filter 27 carries out a distortion compensation process of compensating for an encoding distortion included in the decoded image when the picture encoding method control information decoded by the variable length decoding unit 22 shows that "normal picture encoding is to be carried out", whereas the loop filter 27 carries out a block boundary smoothing process of smoothing the discontinuity existing at a boundary between blocks when the picture encoding method control information shows that "skip picture encoding is to be carried out", there is provided an advantage of being able to improve the quality of the reproduced image.

Embodiment 2.

In above-mentioned Embodiment 1, the image encoding device in which the motion-compensated prediction unit 2 generates a prediction image B by assuming that the motion prediction mode B is the direct prediction mode for use in AVC when the picture encoding method control information shows that "skip picture encoding is to be carried out" is shown. However, the motion prediction mode B is not limited to the direct prediction mode for use in AVC, the motion-compensated prediction unit 2 can alternatively generate a prediction image B in another mode.

Hereafter, a generating process of generating the prediction image B which is carried out by the motion-compensated prediction unit 2 will be explained concretely. FIG. 10 is an explanatory drawing showing an example of the generating process of generating a prediction image B which is carried out by the motion-compensated prediction unit 2 (a generating process in a case of encoding a picture $F_t$ located just midway between already-encoded pictures $F_{t-1}$ and $F_{t+1}$ with respect to time as a skip picture). Further, FIG. 11 is an explanatory drawing showing an estimation of a motion vector $d_f(x, t)$ of a macroblock X.

After encoding the picture F as a P picture or an image which the motion-compensated prediction unit 2 refers to for a subsequent motion-compensated prediction, the motion-compensated prediction unit 2 stores the motion prediction modes, the motion vectors, and the motion prediction error amounts of the plurality of macroblocks in the picture F in the motion parameter memory 1 as a preparation for generating a prediction image B in the motion prediction mode B. When encoding the picture $F_t$ located just midway between the already-encoded pictures $F_{t-1}$ and $F_{t+1}$ with respect to time as a skip picture, as shown in FIG. 10, the motion-compensated prediction unit 2 carries out interpolation in both directions shown in FIG. 10 on the macroblock to be processed.

An interpolation formula in this case is given by the following equation (4).

$$f(x, t) = \frac{f(x + d_f(x, t), t-1) + f(x + d_b(x, t), t+1) + 1}{2} \quad (4)$$

In the equation (4), $d_f(x, t)$ and $d_b(x, t)$ are motion vectors and are estimated and determined from the motion vector of the already-encoded picture $F_{t+1}$ stored in the motion parameter memory 1 in accordance with a procedure shown in FIG. 11.

First, the motion-compensated prediction unit 2 acquires the motion vectors, the motion prediction modes and the amounts of code of prediction residual of nine macroblocks which construct an area R in the already-encoded picture (i.e. the macroblock in the already-encoded picture $F_{t+1}$, which is located at the spatially same position as the macroblock X to be processed in the picture $F_t$ to be encoded, and eight macroblocks located close to the macroblock) from the motion parameter memory 1, and refers to the motion vectors, the motion prediction modes and the amounts of code of prediction residual. At this time, when the motion vector of each of the macroblocks is expressed as $d(x+v_i, t+1)$, $0 \leq i \leq 8$, ($V_4=0$), and the amount of prediction error is expressed as $e(x+v_i, t+1)$, $0 \leq i \leq 8$, ($V_4=0$), the motion-compensated prediction unit can estimate the motion vector $d_f(x, t)$ which is a reference vector to the already-encoded picture $F_{t-1}$ in the block currently being processed on the interpolated image by performing a computation using the following equation (5).

$$d_f(x, t) = \alpha \cdot \frac{\sum_R \varphi_i d(x + v_i, t+1)}{\sum_R \varphi_i} \quad (5)$$

$$\varphi_i = \frac{1}{\sum_{x \in B} |e(x + v_i, t+1)|}$$

where $$\sum_{x \in B} |e(x + v_i, t+1)|$$

is the sum of the absolute values of prediction residuals at $V_i$

By assigning a weight which is the reciprocal of the corresponding amount of prediction error to each vector, a vector in a block having a smaller amount of prediction error is given a larger weight. A method of estimating the motion vector $d_f(x, t)$ which is used in this embodiment is based on the characteristics that the smaller amount of prediction error, the higher degree of reliability the vector itself has, and the larger sum of the absolute values of prediction residuals, the lower degree of reliability the vector itself has. $\alpha$ is a weighting factor which is determined according the time interval between the picture $F_t$ and the picture $F_{t+1}$. However, a block on which intra-frame encoding has been carried out, among the nine macroblocks which construct the R area shown in FIG. 11, is excluded from the above-mentioned computation. It is estimated that the motion vector $d_f(x, t)$ is (0, 0) when a certain percentage or more of the 9 macroblocks in the area R are blocks on which intra-frame encoding has been carried out.

By estimating the motion vector $d_f(x, t)$, as shown in this Embodiment 2, the image encoding device can estimate the motion vector having a higher degree of precision which takes the reliability of the motion vector into consideration as compared with the case in which the motion vector is estimated only by using a direct prediction. Therefore, because the image encoding device can improve the quality of a skip picture, the image encoding device can use a larger number of skip pictures during the encoding process, thereby being able to enhance the effect of reducing the entire code amount. In order to determine an estimated motion vector used for generating a skip picture, a plurality of motion vectors located close to one another with respect to time and space are held in advance as estimated motion vector candidates, and an optimal estimated motion vector is selected independently by the encoding device or by the encoding device and the decoding device in conjunction with each other so that the optimal estimated motion vector is used for generation of a decoded image of the skip picture. In a case in which the encoding device selects an optimal estimated motion vector, the encoding device is constructed in such a way as to multiplex an index of the optimal estimated motion vector which is acquired for each unit in which an estimated motion vector is determined into the bitstream. In contrast, in a case in which the encoding device and the decoding device select an optimal estimated motion vector by using the same determining method, the decoding device needs to carry out an additional process for selection of an estimated motion vector while it is not necessary to multiplex an index of the estimated motion vector into the bitstream, thereby being able to improve the degree of encoding efficiency. Because the encoding device and the decoding device which are constructed in this way can select an estimated motion vector from among a plurality of candidates, there is provided an advantage of being able to carry out encoding while maintaining the quality even when an estimated motion vector which is uniquely acquired in accordance with a certain specific estimating method does not have an adequate degree of precision.

Industrial Applicability

Because the image encoding device, the image decoding device, the image encoding method, and the image decoding method can improve the quality of the playback image in the receive side, they are in accordance with the present invention suitable for using for image compression coding technique, compressed image data transmission technique, etc.

Explanations of Reference Numerals

1 motion parameter memory, 2 motion-compensated prediction unit (prediction image generating unit, motion detecting unit, first prediction image generating unit, motion vector generating unit, second prediction image generating unit), 3 subtractor (difference image selecting unit, encoding unit), 4 encoding mode determining unit (difference image selecting unit, encoding unit), 5 compressing unit (quantizing unit), 6 local decoding unit (reference image generating unit, local decoding unit), 7 selection switch (reference image generating unit, local decoding unit), 8 adder (reference image generating unit, local decoding unit), 9 loop filter (reference image generating unit, filtering unit), 10 frame memory, 11 variable length encoding unit (variable length encoding unit, encoding unit), 21 motion parameter memory, 22 variable length decoding unit (variable length decoding unit, first prediction image generating unit, decoding unit), 23 prediction error decoding unit (inverse quantizing unit, decoding unit), 24 motion compensation unit (prediction image generating unit, first prediction image generating unit, motion vector generating unit, second prediction image generating unit), 25 selection switch (decoded image generating unit), 26 adder (decoded image generating unit, adding unit), 27 loop filter (decoded image generating unit, filtering unit), 28 frame memory.

The invention claimed is:

1. An image encoding device which carries out compression encoding on each predetermined block of an inputted image by using a motion-compensated prediction, said image encoding device comprising:
    a motion detecting unit for detecting a motion vector of said block;
    a first prediction image generating unit for generating a first prediction image by using the motion vector detected by said motion detecting unit;
    a memory for holding a motion vector detected by said motion detecting unit;
    a second prediction image generating unit for generating a second prediction image by using a motion vector of a block to be encoded which is generated on a basis of the motion vector held by said memory;
    an encoding unit for encoding a difference image which is a difference between the first prediction image generated by said first prediction image generating unit and an image of the block to be encoded while encoding the motion vector used for the generation of said first prediction image;
    a local decoding unit for generating a local decoded image of said difference image, and for adding said local decoded image to said first prediction image to generate a local decoded image; and
    a filtering unit for carrying out a smoothing process on a block boundary in the second prediction image generated by said second prediction image generating unit, wherein
    said image encoding device selects either the first local decoded image of said block which is acquired by said local decoding unit or an image acquired by said filtering unit as a local decoded image in a predetermined image area which consists of one or more of said blocks, and multiplexes a result of the selection into a bitstream and carries out encoding transmission of this bitstream.

2. The image encoding device according to claim 1, wherein when control information for instructing a use of only said second prediction image generating unit is inputted, said first prediction image generating unit does not generate the prediction image while only said second prediction image generating unit generates the prediction image.

3. The image encoding device according to claim 2, wherein said image encoding device includes a motion vector generating unit for generating the motion vector of the block to be encoded on a basis of the motion vector held by said memory, and said second prediction image generating unit generates the second prediction image by using the motion vector generated by said motion vector generating unit.

4. An image encoding device comprising:
    a prediction image generating unit having a first prediction image generating method of searching for a motion vector between a block to be encoded and a reference image for each block which constructs an inputted image, and carrying out a motion-compensated prediction process using said motion vector to generate a prediction image, and a second prediction image generating method of generating a direct vector of the block to be encoded from a motion vector of an already-encoded block, and carrying out a motion-compensated prediction process using said direct vector to generate a prediction image, said prediction image generating unit generating a prediction image only by using said second prediction image generating method without generating a prediction image by using said first prediction image generating method when control information for instructing a use of only said second prediction image generating method is inputted;

a difference image selecting unit for evaluating a degree of efficiency of encoding of a difference image which is a difference between an image of the block to be encoded and the prediction image generated by said prediction image generating unit by using the first prediction image generating method, and also evaluating a degree of efficiency of encoding of a difference image which is a difference between the image of the block to be encoded and the prediction image generated by said prediction image generating unit by using the second prediction image generating method to select a difference image having a higher one of said degrees of encoding efficiency;

a quantizing unit for quantizing the difference image selected by said difference image selecting unit to output quantization coefficients of said difference image; and a variable length encoding unit for variable-length-encoding prediction image identification information showing whether the prediction image associated with the quantization coefficients outputted from said quantizing unit and the difference image selected by said difference image selecting unit is either the one generated by using the first prediction image generating method or the one generated by using the second prediction image generating method, and, when the difference image selected by said difference image selecting unit is the one associated with the prediction image generated by using the first prediction image generating method, variable-length-encoding the motion vector which is searched for by said prediction image generating unit to generate encoded data.

5. The image encoding device according to claim 4, wherein when control information for instructing a use of only the second prediction image generating method is inputted, the difference image selecting unit replaces a prediction error signal showing the difference image which is a difference between the image of the block to be encoded and the prediction image generated by the prediction image generating unit by using the second prediction image generating method with zero values.

6. The image encoding device according to claim 5, wherein when control information for instructing a use of only the second prediction image generating method is inputted, the quantizing unit does not carry out a quantization process on the prediction error signal showing the difference image selected by the difference image selecting unit, but outputs a prediction error signal having zero values to the variable length encoding unit.

7. The image encoding device according to claim 6, wherein said image encoding device includes a reference image generating unit for inverse-quantizing the quantization coefficients outputted from the quantizing unit, for adding a difference image shown by a result of the inverse quantization and the prediction image generated by the prediction image generating unit to generate a local decoded image, and for storing said local decoded image in a frame memory as a reference image, and wherein said reference image generating unit carries out a block boundary smoothing process of smoothing discontinuity existing at a boundary between blocks when said prediction image is generated by using the second prediction image generating method.

8. The image encoding device according to claim 7, wherein when control information for instructing a use of only the second prediction image generating method is inputted, the reference image generating unit does not carry out the inverse quantization process on the quantization coefficients outputted from the quantizing unit, but handles the prediction image generated by the prediction image generating unit as a local decoded image.

9. An image decoding device which receives, as an input, a bitstream which is acquired by compression-encoding each predetermined block of an image by using a motion-compensated prediction, and which carries out a decoding expansion process on said each block, said image decoding device comprising:

a first prediction image generating unit for decoding a motion vector of said each block from the bitstream, and for generating a first prediction image by using said motion vector;

a decoding unit for decoding encoded data about a difference image for motion-compensated prediction of said each block from the bitstream, and for generating a decoded difference image from said encoded data;

an adding unit for adding said first prediction image and said decoded difference image to acquire a decoded image;

a memory for holding a motion vector which is acquired by decoding said bitstream;

a second prediction image generating unit for generating a second prediction image by using a motion vector of a block to be decoded which is generated on a basis of the motion vector held by said memory; and a filtering unit for carrying out a smoothing process on a block boundary in the second prediction image generated by said second prediction image generating unit, wherein for each predetermined image area which consists of one or more of said blocks, said image decoding device decodes identification information showing that either the decoded image outputted from said adding unit or an image outputted from said filtering unit is a final decoded image in all of said one or more blocks in said image area from the bitstream, and generates a final decoded image on a basis of said identification information.

10. The image decoding device according to claim 9, wherein when control information for instructing a use of only said second prediction image generating unit is inputted, said first prediction image generating unit does not generate the prediction image while only said second prediction image generating unit generates the prediction image.

11. The image decoding device according to claim 10, wherein said image decoding device includes a motion vector generating unit for generating the motion vector of the block to be decoded on a basis of the motion vector held by said memory, and said second prediction image generating unit generates the second prediction image by using the motion vector generated by said motion vector generating unit.

12. An image decoding device comprising:

a variable length decoding unit for decoding quantization coefficients and prediction image identification information showing whether an image encoding device generates a prediction image by using either a first prediction image generating method or a second prediction image generating method from encoded data, and for, when the prediction image is generated by using the first prediction image generating method, decoding a motion vector from the encoded data;

an inverse quantizing unit for inverse-quantizing the quantization coefficients decoded by said variable length decoding unit;

a prediction image generating unit for carrying out a motion-compensated prediction process using the motion vector decoded by said variable length decoding unit to generate a prediction image when the prediction image identification information decoded by said variable length decoding unit shows that the image encoding device generates the prediction image by using the first prediction image generating method, and for generating a direct vector of a block to be decoded from a motion vector of an already-decoded block and carrying out a motion-compensated prediction process using said direct vector to generate a prediction image when the prediction image identification information decoded by said variable length decoding unit shows that the image encoding device generates the prediction image by using the second prediction image generating method; and a decoded image generating unit for handling the prediction image generated by the prediction image generating unit as a decoded image when the prediction image identification information decoded by said variable length decoding unit shows that said image encoding device generates the prediction image by using the second prediction image generating method.

13. The image decoding device according to claim 12, wherein the decoded image generating unit carries out a block boundary smoothing process of smoothing discontinuity existing at a boundary between blocks when the prediction image identification information decoded by the variable length decoding unit shows that the image encoding device generates the prediction image by using the second prediction image generating method.

14. An image encoding method comprising:

a first prediction image generating process step of a prediction image generating unit implementing a first prediction image generating method of searching for a motion vector between a block to be encoded and a reference image for each block which constructs an inputted image, and carrying out a motion-compensated prediction process using said motion vector to generate a prediction image;

a second prediction image generating process step of said prediction image generating unit implementing a second prediction image generating method of generating a direct vector of the block to be encoded from a motion vector of an already-encoded block, and carrying out a motion-compensated prediction process using said direct vector to generate a prediction image;

a difference image selecting process step of a difference image selecting unit evaluating a degree of efficiency of encoding of a difference image which is a difference between an image of the block to be encoded and the prediction image generated in said first prediction image generating process step, and also evaluating a degree of efficiency of encoding of a difference image which is a difference between the image of the block to be encoded and the prediction image generated in said second prediction image generating process step to select a difference image having a higher one of said degrees of encoding efficiency;

a quantizing process step of a quantizing unit quantizing the difference image selected in said difference image selecting process step to output quantization coefficients of said difference image; and a variable length encoding process step of a variable length encoding unit variable-length-coding prediction image identification information showing whether or not the prediction image associated with the quantization coefficients outputted in said quantizing process step and the difference image selected in said difference image selecting process step is the one generated by using the second prediction image generating method, and, when the difference image selected by said difference image selecting unit is the one associated with the prediction image generated by using the first prediction image generating method, variable-length-encoding the motion vector which is searched for in said prediction image generating process step to generate encoded data.

15. An image decoding device comprising:

a variable length decoding process step of a variable length decoding unit decoding quantization coefficients and prediction image identification information showing whether an image encoding device generates a prediction image by using either a first prediction image generating method or a second prediction image generating method from encoded data, and, when the prediction image is generated by using the first prediction image generating method, decoding a motion vector from the encoded data;

an inverse quantizing process step of an inverse quantizing unit inverse-quantizing the quantization coefficients decoded in said variable length decoding process step;

a prediction image generating process step of a prediction image generating unit generating a direct vector of a block to be decoded from a motion vector of an already-decoded block and carrying out a motion-compensated prediction process using said direct vector to generate a prediction image when the prediction image identification information decoded in said variable length decoding process step shows that the image encoding device generates the prediction image by using the second prediction image generating method; and a decoded image generating process step of a decoded image generating unit adding the prediction image generated in said prediction image generating process step and a difference image shown by a result of the inverse quantization carried out in said inverse quantizing process step to generate a decoded image corresponding to an inputted image inputted to said image encoding device.

* * * * *

UNITED STATES PATENT AND TRADEMARK OFFICE
CERTIFICATE OF CORRECTION

| | | |
|---|---|---|
| PATENT NO. | : 8,948,243 B2 | |
| APPLICATION NO. | : 13/638095 | |
| DATED | : February 3, 2015 | |
| INVENTOR(S) | : Shunichi Sekiguchi et al. | |

It is certified that error appears in the above-identified patent and that said Letters Patent is hereby corrected as shown below:

IN THE CLAIMS:

In Claim 7, at column 27, line 62, change "claim 6" to --claim 4--.

In Claim 14, at column 30, line 15, change "variable-length-coding" to --variable-length-encoding--.

Signed and Sealed this
Fifteenth Day of March, 2016

Michelle K. Lee
*Director of the United States Patent and Trademark Office*